(12) United States Patent
Han et al.

(10) Patent No.: US 8,208,438 B2
(45) Date of Patent: Jun. 26, 2012

(54) METHOD AND APPARATUS FOR ALLOCATING RESOURCES OF A CONTROL CHANNEL IN A MOBILE COMMUNICATION SYSTEM USING ORTHOGONAL FREQUENCY DIVISION MULTIPLEXING

(75) Inventors: Jin-Kyu Han, Seoul (KR); Ju-Ho Lee, Suwon-si (KR); Hwan-Joon Kwon, Suwon-si (KR); Young-Bum Kim, Seoul (KR); Byung-Sik Kim, Suwon-si (KR); Hyoung-Ju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 725 days.

(21) Appl. No.: 12/244,445

(22) Filed: Oct. 2, 2008

(65) Prior Publication Data

US 2009/0097447 A1    Apr. 16, 2009

(30) Foreign Application Priority Data

Oct. 2, 2007    (KR) .................. 10-2007-0099537
Nov. 20, 2007    (KR) .................. 10-2007-0118847
Jan. 2, 2008    (KR) .................. 10-2008-0000400

(51) Int. Cl.
    *H04W 4/00*    (2009.01)

(52) U.S. Cl. ...................................... 370/330; 370/329

(58) Field of Classification Search .................. 307/206; 370/330
See application file for complete search history.

(56) References Cited

U.S. PATENT DOCUMENTS

| 2005/0025039 A1* | 2/2005 | Hwang et al. ................ 370/206 |
| 2005/0135324 A1 | 6/2005 | Kim et al. |
| 2007/0208986 A1* | 9/2007 | Luo et al. ...................... 714/752 |
| 2008/0008256 A1 | 1/2008 | Matsumoto et al. |
| 2008/0019293 A1 | 1/2008 | Chang et al. |

FOREIGN PATENT DOCUMENTS

| RU | 2005 135 926 | 4/2006 |
| WO | WO 2006/013729 | 2/2006 |
| WO | WO 2007/059791 | 5/2007 |
| WO | WO 2007/075731 | 7/2007 |
| WO | WO 2007/096038 | 8/2007 |

OTHER PUBLICATIONS

3GPP TS 36.211 V8.0.0 (Sep. 2007)—3rd Generation Partnership Project; Technical Specification Group Radio Access Network; Evolved Universal Terrestrial Radio Access (E-UTRA); Physical channels and modulation (Release 8).*
Motorola: "Search Space Definition for L1/L2 Control Channels", R1-073373, 3GPP TSG RAN1#50, Aug. 24, 2007.

* cited by examiner

*Primary Examiner* — Derrick Ferris
*Assistant Examiner* — Majid Esmaeilian
(74) *Attorney, Agent, or Firm* — The Farrell Law Firm, P.C.

(57) ABSTRACT

A method is provided for allocating resources of a control channel in a mobile communication system using Orthogonal Frequency Division Multiplexing (OFDM). The method includes, when a time index and a frequency index of available Resource Elements (REs) are defined as l and k, respectively, dividing the available REs in a two-dimensional structure of (k, l); and time-first-allocating each RE to a plurality of RE groups while increasing the time index l for each frequency index k from an initial value up to a predetermined range.

28 Claims, 16 Drawing Sheets

METHOD AND APPARATUS FOR ALLOCATING RESOURCES OF A CONTROL CHANNEL IN A MOBILE COMMUNICATION SYSTEM USING ORTHOGONAL FREQUENCY DIVISION MULTIPLEXING

PRIORITY

This application claims priority under 35 U.S.C. §119(a) to a Korean Patent Application filed in the Korean Intellectual Property Office on Oct. 2, 2007 and assigned Serial No. 2007-99537, a Korean Patent Application filed in the Korean Intellectual Property Office on Nov. 20, 2007 and assigned Serial No. 2007-118847, and a Korean Patent Application filed in the Korean Intellectual Property Office on Jan. 2, 2008 and assigned Serial No. 2008-400, the disclosures of all of which are incorporated herein by reference.

BACKGROUND OF THE INVENTION

1. Field of the Invention

The present invention relates generally to a method and apparatus for allocating resources of a physical channel in a communication system using Orthogonal Frequency Division Multiplexing (OFDM), and in particular, to a method and apparatus for allocating resources of a downlink control channel.

2. Description of the Related Art

Recently, in mobile communication systems, intensive research has been conducted on Orthogonal Frequency Division Multiplexing (OFDM) as a scheme useful for high-speed data transmission on wire/wireless channels. OFDM, a scheme for transmitting data using multiple carriers, is a kind of Multi-Carrier Modulation (MCM) that converts a serial input symbol stream into parallel symbols, and modulates each of the parallel symbols with multiple orthogonal frequency tones, or multiple orthogonal subcarrier channels before transmission of the parallel symbols.

The MCM-based system was first applied to military high-frequency radios in the late 1950s, and OFDM, which overlaps multiple orthogonal subcarriers, has been in development since the 1970s. However, application of OFDM to actual systems was limited due to the difficulties in realizing orthogonal modulation between multiple carriers. However, Weinstein et al. showed in 1971 that OFDM-based modulation/demodulation can be efficiently processed using Discrete Fourier Transform (DFT), and remarkable technical developments in OFDM have been made over time. Additionally, as OFDM uses a guard interval, and a scheme of inserting a Cyclic Prefix (CP) into the guard interval is known, the OFDM system has noticeably reduced the negative influence for the system's multipath and delay spread.

Owing to such technical developments, OFDM technology is widely applied to digital transmission technologies such as Digital Audio Broadcasting (DAB), Digital Video Broadcasting (DVB), Wireless Local Area Network (WLAN) and Wireless Asynchronous Transfer Mode (WATM), i.e., OFDM, which was not widely used, due to hardware complexity, can now be realized with the recent development of various digital signal processing technologies, including Fast Fourier Transform (FFT) and Inverse Fast Fourier Transform (IFFT).

OFDM, although similar to the conventional Frequency Division Multiplexing (FDM), is characterized in that OFDM can obtain the optimal transmission efficiency during high-speed data transmission by keeping the orthogonality between multiple tones during the transmission. Additionally, OFDM, having a high frequency efficiency and robustness against multi-path fading, can obtain an optimal transmission efficiency during high-speed data transmissions. OFDM provides several other advantages. Since OFDM overlaps frequency spectra, OFDM has a high frequency efficiency, is robust against frequency-selective fading, and impulse noises, can reduce an Inter-Symbol Interference (ISI) influence using the guard interval, and enables simple designs of hardware equalizers. Therefore, there is an increasing tendency for OFDM to be actively used for communication system configurations.

In wireless communications, high-speed, high-quality, data services are hindered mainly due to channel environments. The channel environments are subject to frequent change, not only due to Additive White Gaussian Noise (AWGN), but also due to a received signal's power variation caused by a fading phenomenon, shadowing, a Doppler effect based on movement and frequent velocity change of a terminal, and interference to/from other users and multipath signals. Therefore, in order to support high-speed, high-quality data services in wireless communications, there is a need to effectively address impeding factors.

In OFDM, a modulation signal is transmitted via allocated two-dimensional time-frequency resources. Resources on the time domain are classified into different OFDM symbols, and the OFDM symbols are orthogonal to each other. Resources on the frequency domain are classified into different tones, and the tones are also orthogonal to each other, i.e., in OFDM, it is possible to indicate a unit resource by appointing a particular OFDM symbol on the time domain and a particular tone on the frequency domain, and the unit resource is called a Resource Element (RE). As different REs are orthogonal to each other, even though they experience a selective channel, signals transmitted on different REs can be received without mutual interference.

A physical channel is a channel of a physical layer that transmits a modulation symbol obtained by modulating at least one coded bit stream. An Orthogonal Frequency Division Multiple Access (OFDMA) system generates and transmits multiple physical channels according to the use of a transmission information stream or the receiver. A transmitter and a receiver should previously agree on the rule for determining for which REs the transmitter and receiver will arrange one physical channel during transmission of the REs, and this rule is called 'mapping'.

Mapping rules may vary according to the application feature of the particular physical channel. When the transmitter maps a physical channel using a scheduler to increase the system's transmission efficiency in the state where the transmitter perceives a state of a received channel, it is preferable to arrange one physical channel on a set of REs having similar channel states, and when the transmitter maps a physical channel, while aiming to decrease a reception error rate in the state where the transmitter fails to perceive a state of the received channel, it is preferable to arrange one physical channel on a set of REs expected to have very different channel states. The former scheme is mainly suitable for cases where the transmitter transmits data for one user who is insusceptible to a time delay, and the latter scheme is mainly suitable for cases where the transmitter transmits data or control information for one user who is susceptible to the time delay, or transmits data or control information to a plurality of users. The latter scheme uses resources having different channel states in order to obtain diversity gain, and within one OFDM symbol, frequency diversity gain can be obtained by mapping a physical channel to subcarriers that are spaced as far apart as possible on the frequency domain.

Recently, in the 3rd Generation Partnership Project (3GPP), a standardization work for a radio link between a Node B (also known as a Base Station (BS)) and a User Equipment (UE; also known as a Mobile Station (MS)) has been conducted in the name of a Long Term Evolution (LTE) system. The LTE system is most characterized by adopting OFDMA and Single Carrier Frequency Domain Multiple Access (SC-FDMA) as multiplexing schemes of the downlink and the uplink, respectively. The present invention proposes a method for mapping control channels of the LTE downlink to REs.

FIG. 1 illustrates a subframe structure in a general LTE system.

One Resource Block (RB) is composed of 12 tones in the frequency domain and 14 OFDM symbols in the time domain. RB #1 111 represents the first RB, and FIG. 1 shows a bandwidth composed of a total of K RBs from RB #1 111 to RB #K 113. In the time domain, 14 OFDM symbols constitute one subframe 117, and become a basic unit of resource allocation in the time domain. One subframe 117 has a length of, for example, 1 ms, and is composed of two slots 115.

A Reference Signal (RS), which is agreed upon with a Node B so that a UE can perform channel estimation, is transmitted, and RS0 100, RS1 101, RS2 102 and RS3 103 are transmitted from antenna ports #1, #2, #3 and #4, respectively. If only one transmit antenna port is used, RS1 101 is not used for transmission, and RS2 102 and RS3 103 are used for transmission of data or control signal symbols. If two transmit antenna ports are defined, RS2 102 and RS3 103 are used for transmission of data or control signal symbols.

On the frequency domain, though the absolute positions of REs where RSs are arranged are set differently for each cell, a relative interval between RSs is kept constant, i.e., RSs for the same antenna port maintain a 6-RE interval, and a 3-RE interval, is maintained between RS0 100 and RS1 101, and between RS2 102 and RS3 103. The absolute positions of RSs are set differently for each cell in order to avoid inter-cell collision of RSs.

Meanwhile, a control channel is disposed in the forefront of one subframe on the time domain. In FIG. 1, reference numeral 119 shows a region where a control channel can be disposed. A control channel can be transmitted over L leading OFDM symbols of a subframe, where L=1, 2 and 3. When the control channel can be sufficiently transmitted with one OFDM symbol as an amount of data to be transmitted is small, only 1 leading OFDM symbol is used for control channel transmission (L=1), and the remaining 13 OFDM symbols are used for data channel transmission. When the control channel uses 2 OFDM symbols, only 2 leading OFDM symbols are used for control channel transmission (L=2), and the remaining 12 OFDM symbols are used for data channel transmission. When the control channel uses all of 3 OFDM symbols as the amount of data to be transmitted is large, 3 leading OFDM symbols are used for control channel transmission (L=3), and the remaining 11 OFDM symbols are used for data channel transmission.

The reason for disposing the control channel in the forefront of a subframe is to allow a UE to determine whether the UE will perform a data channel reception operation by first receiving the control channel and perceiving the existence of a data channel transmitted to the UE itself. Therefore, if there is no data channel transmitted to the UE itself, the UE has no need to perform data channel reception, making it possible to save the power consumed in the data channel reception operation.

The downlink control channel, defined by the LTE system, includes a Physical Channel Format Indication CHannel (PC-FICH), a Physical H-ARQ (Hybrid-Automatic Repeat reQuest) Indicator Channel (PHICH), and a Packet Dedicated Control CHannel (PDCCH). A PCFICH is a physical channel for transmitting Control Channel Format Indicator (CCFI) information. CCFI is 2-bit information for indicating a region L where the control channel can be disposed. Because the UE cannot receive the control channel until the first receives CCFI, PCFICH is a channel that all UEs must first receive in the subframe, except when downlink resources are fixedly (persistently) allocated. Further, since the UE cannot know the region L before the UE receives PCFICH, PCFICH should be transmitted in the first OFDM symbol. A PHICH is a physical channel for transmitting a downlink ACK/NACK signal. A UE receiving a PHICH is a UE that is performing data transmission on the uplink. Therefore, the number of PHICHs is proportional to the number of UEs that are now performing data transmission on the uplink. The PHICH is transmitted in the first OFDM symbol ($L_{PHICH}=1$), or transmitted over three OFDM symbols ($L_{PHICH}=3$). $L_{PHICH}$ is a parameter defined for every cell, and for a large-sized cell, since there is difficulty in transmitting the PHICH only with one OFDM symbol, the parameter $L_{PHICH}$ is introduced to adjust it. PDCCH is a physical channel for transmitting data channel allocation information or power control information.

For the PDCCH, a channel coding rate can be differently set according to a channel state of a UE that receives the PDCCH. Since the PDCCH fixedly uses Quadrature Phase Shift Keying (QPSK) as a modulation scheme, the amount of resources used by one PDCCH should be changed in order to change the channel coding rate. A high channel coding rate is applied to a UE having a good channel state to reduce the amount of resources used. However, a low channel coding rate is applied to a UE having a poor channel state even though the amount of resources used is increased, thus enabling normal reception. The amount of resources consumed by individual PDCCHs is determined in units of Control Channel Elements (CCEs). For a UE having a good channel state, the PDCCH is composed of only one CCE, and for a UE having a poor channel state, the PDCCH is generated using a maximum of 8 CCEs. The number of CCEs used for generating one PDCCH is one of 1, 2, 4 and 8. One CCE is composed of a set of $N_{CCE}$ mini-CCEs. A mini-CCE is a set of 4 consecutive REs except for the RE used for an RS on the frequency domain. For $N_{CCE}=9$, the number of REs used for generating one PDCCH is one of 36, 72, 144 and 288.

A mini-CCE is a basic unit of resources constituting a PCFICH and a PHICH. The PCFICH and the PHICH use a predetermined amount of resources, and in order to ease the application of multiplexing with PDCCH and transmission diversity, the amount of resources is determined as a set of mini-CCEs. One PCFICH is generated using $N_{PCFICH}$ mini-CCEs, and one PHICH is generated using $N_{PHICH}$ mini-CCEs. For $N_{PCFICH}=4$ and $N_{PHICH}=3$; the PCFICH uses 16 REs and the PHICH uses 12 REs.

In order to multiplex several ACK/NACK signals, the PHICH employs a Code Division Multiplexing (CDM) technique. Four PHICHs are CDM-multiplexed to one mini-CCE, and are repeatedly transmitted so that the PHICHs are spaced as far apart as by $N_{PHICH}$ on the frequency domain in order to obtain frequency diversity gain. Therefore, with a use of $N_{PHICH}$ mini-CCEs, 4 or less PHICHs can be generated. In order to generate more than 4 PHICHs, another $N_{PHICH}$ mini-CCEs should be used. If the required number of PHICHs is M, ceil(M/4)×$N_{PHICH}$ mini-CCEs, i.e., 4×ceil(M/4)×$N_{PHICH}$ REs, are used. Here, ceil(x) is a ceiling function used for calculating the minimum integer greater than or equal to x.

In the mobile communication system using OFDM, a description of which has been made with reference to the LTE system, the conventional resource allocation scheme for transmitting a downlink control channel is as follows: When allocation of an RE set for transmission of a control channel is completed in the entire frequency band of the first OFDM symbol period, allocation of an RE set for transmission of a control channel is performed in the entire frequency band of the second OFDM symbol period. In this manner, in the conventional resource allocation scheme, resource allocation for an RE set is performed in a frequency-first manner in each OFDM symbol period used for transmission of a control channel.

SUMMARY OF THE INVENTION

An aspect of the present invention is to address at least the problems and/or disadvantages and to provide at least the advantages described below. Accordingly, the present invention provides a method and apparatus for performing resource allocation on a downlink control channel in a time-first manner in a mobile communication system using OFDM.

Further, the present invention provides a resource allocation method and apparatus for a control channel, for improving diversity gain in a mobile communication system using OFDM.

In addition, the present invention provides a method and apparatus for performing resources allocation on a PDCCH in a downlink of an LTE system in a time-first manner.

According to one aspect of the present invention, there is provided a method for allocating resources of a control channel in a mobile communication system using Orthogonal Frequency Division Multiplexing (OFDM). The method includes, when a time index and a frequency index of available Resource Elements (REs) are defined as l and k, respectively, dividing the available REs in a two-dimensional structure of (k, l); and time-first-allocating each RE to a plurality of RE groups while increasing the time index l for each frequency index k from an initial value up to a predetermined range.

According to another aspect of the present invention, there is provided an apparatus for allocating resources of a control channel by a Node B in a mobile communication system using Orthogonal Frequency Division Multiplexing (OFDM). The apparatus includes a mapper for mapping Resource Elements (REs) available for transmission of the control channel; and a controller for, when a time index and a frequency index of the available REs are defined as l and k, respectively, dividing the available REs in a two-dimensional structure of (k, l), and controlling the mapper to time-first-allocate each RE to a plurality of RE groups while increasing the time index l for each frequency index k from an initial value up to a predetermined range.

According to further another aspect of the present invention, there is provided an apparatus for receiving a control channel by a User Equipment (UE) in a mobile communication system using Orthogonal Frequency Division Multiplexing (OFDM). The apparatus includes a receiver for receiving the control channel from a wireless channel; a demapper for demapping Resource Elements (REs) from the received control channel; and a controller for, when a time index and a frequency index of available REs are defined as l and k, respectively, dividing the available REs in a two-dimensional structure of (k, l), and controlling the demapper to demap the control channel, which was transmitted according to a mapping rule for time-first-allocating each RE to a plurality of RE groups while increasing the time index l for each frequency index k from an initial value up to a predetermined range.

BRIEF DESCRIPTION OF THE DRAWINGS

The above and other aspects, features and advantages of the present invention will become more apparent from the following detailed description when taken in conjunction with the accompanying drawings in which:

FIG. 2 is a diagram illustrating mini-CCE indexes in a control resource block #0 for $N_{ant}$=4 and L=3 according to an exemplary embodiment of the present invention;

FIG. 3 is a diagram illustrating a control resource block and a mini-CCE indexing method for $N_{ant}$=4 and L=3 according to an exemplary embodiment of the present invention;

DETAILED DESCRIPTION OF PREFERRED EMBODIMENTS

Figure 1:
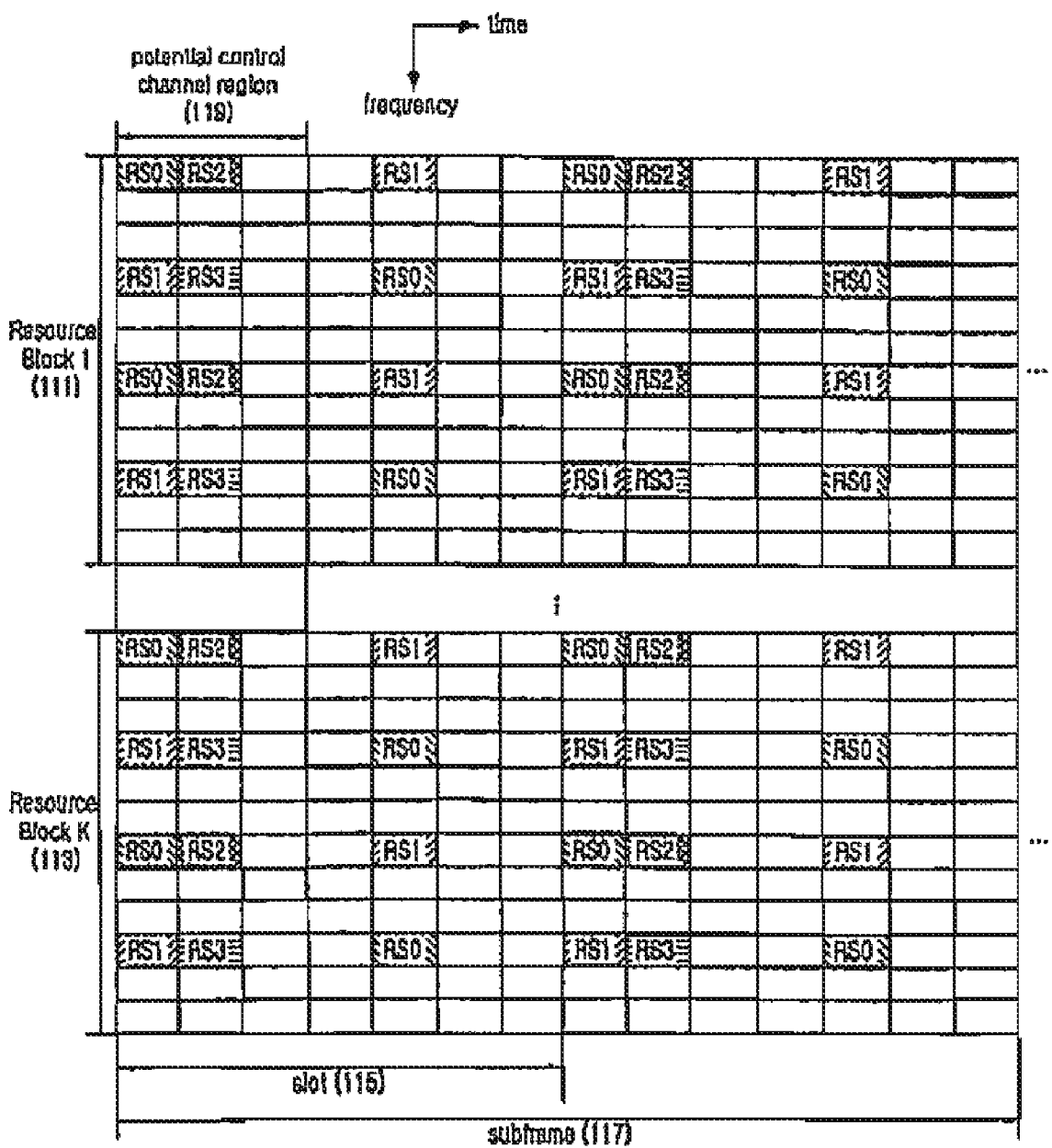
FIG. 1 is a diagram illustrating a subframe structure in a general LTE system.

Preferred embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operators' intention or usual practices. Therefore, the terms should be defined according to contents throughout the specification.

For a better understanding of the present invention, a description of the present invention will be made herein separately for mini-CCE indexing, resource-mapping for a physical channel, and resource-mapping for a control channel. Particularly, in a description of mini-CCE indexing, the number $N_{ant}$ of antenna ports and the number L of OFDM symbols used for a control channel will be described in detail for a better understanding. The present invention indexes mini-CCEs in a time-first manner, maps them to a physical channel by regular-gap resource selection or zone-based resource selection, and then maps a control channel such as a PCFICH, a PHICH and a PDCCH to the physical channel.

Mini-CCE Indexing

In order to define a rule for determining for which control channel using individual mini-CCEs, or physical resources, a method for indexing mini-CCEs is first defined. A mini-CCE indexing method is defined differently according to the number $N_{ant}$ of antenna ports and the number L of OFDM symbols used for a control channel, and applies in common a rule for indexing two-dimensional mini-CCEs first on the time domain.

With reference to FIGS. 2 to 14, a detailed description will be made of various examples of resource allocation for a control channel in an OFDM-based mobile communication system according to an embodiment of the present invention.

Figures 2, 3:
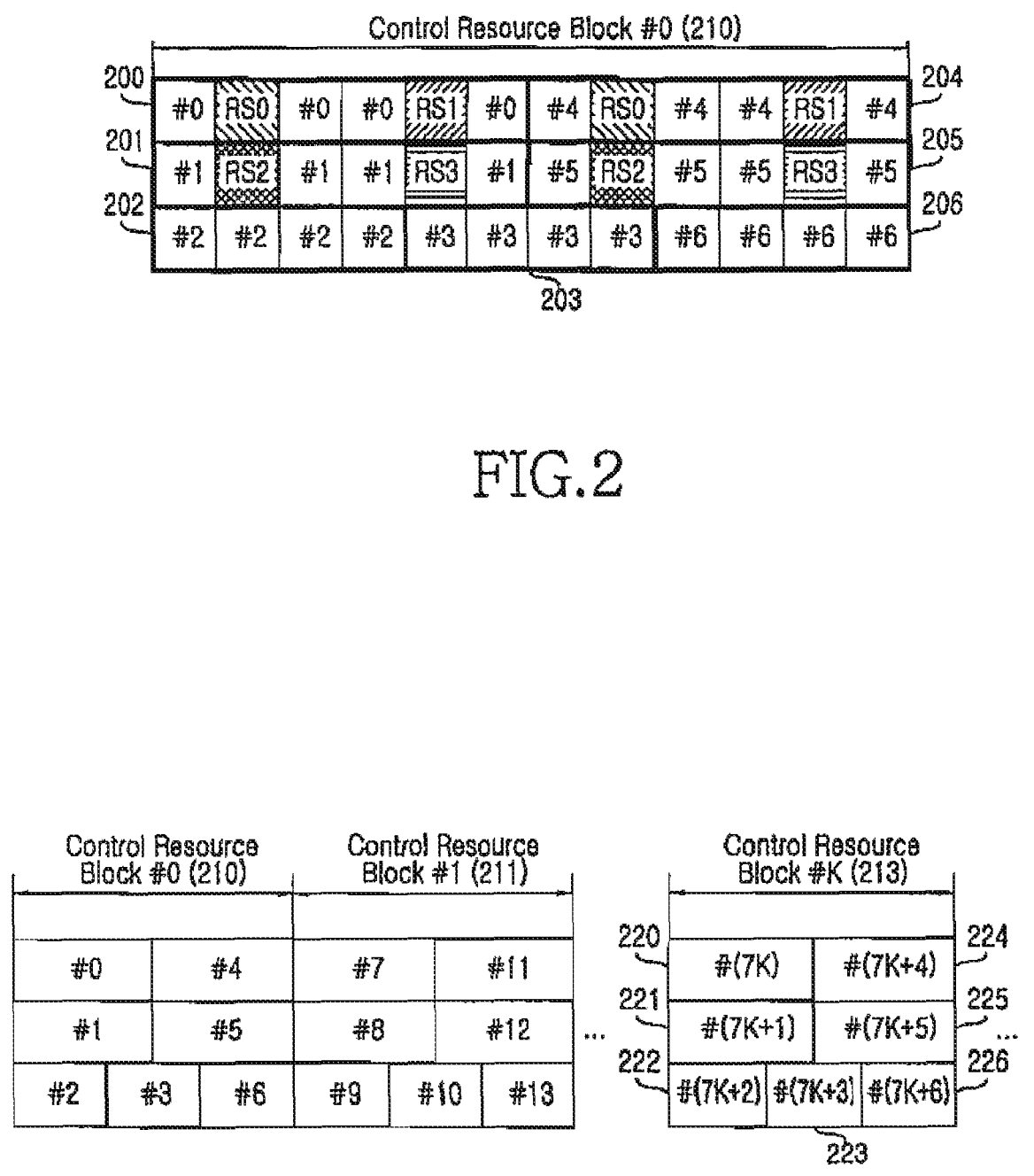

FIG. 2 illustrates mini-CCE indexes in a control resource block #0 for $N_{ant}=4$ and L=3.

The term 'control resource block', as used herein, refers to a set of resources composed of 12 REs on the frequency domain and L OFDM symbols on the time domain. The 12 REs are equal in number to frequency-domain resources constituting one RB. Assuming that there is almost no difference in channel response within one RB, the LTE system defines 12 frequency-domain REs constituting one RB, as one RB. It can be considered that there is almost no difference in channel response within a control resource block based on this assumption. Although positions of RSs in FIG. 2 can vary according to the definition given by a cell, the variance exerts no influence on the mini-CCE indexing.

As illustrated in FIG. 2, for $N_{ant}=4$ and L=3, one control resource block includes 7 mini-CCEs. Reference numeral 200 indicates a mini-CCE #0. One mini-CCE should be composed of 4 valid REs, and since 2 REs are used for RS0 and RS1 in the mini-CCE #0, the mini-CCE #0 is composed of 6 REs, including RSs. When time-first indexing is applied, the next mini-CCE is a mini-CCE #1, 201 disposed in the next OFDM symbol. Similarly, since 2 REs are used for RS2 and RS3, the mini-CCE #1 is composed of 6 REs, including RSs. A mini-CCE #2 202 is disposed in the next OFDM symbol. In the subframe, since no RS is defined in the third OFDM symbol, 4 REs constitute one mini-CCE purely. A mini-CCE #3 203 is disposed in the same OFDM symbol as that of the mini-CCE #2 202. Similarly, when the time-first indexing rule is applied, mini-CCEs #4 204, #5 205 and #6 206 are disposed in the first, second and third OFDM symbols, respectively, and the mini-CCE #4 204 and the mini-CCE #5 205 each include 6 REs due to the RSs.

FIG. 3 illustrates a control resource block and a mini-CCE indexing method for $N_{ant}=4$ and L=3. The mini-CCE indexing method within one control resource block is explained hereinabove regarding FIG. 2, and the method in which mini-CCEs are indexed over the entire system band is described regarding FIG. 3. Mini-CCE indexes in a control resource block #0 210 are equal to the mini-CCE indexes in FIG. 2, and a control resource block #1 211 is also subjected to mini-CCE indexing in the same manner. In a generalized description of mini-CCE indexes, a total of 7 mini-CCEs of mini-CCE #7K to mini-CCE #(7K+6) are defined in a control resource block #K 213 in the order of 220, 221, 222, 223, 224, 225 and 226. Among the mini-CCEs, the mini-CCEs 220 and 224 are disposed in the first OFDM symbol, the mini-CCEs 221 and 225 are disposed in the second OFDM symbol, and the mini-CCEs 222, 223, and 226 are disposed in the third OFDM symbol. It is possible to determine in which OFDM symbol a particular mini-CCE is disposed, by calculating the remainder obtained by dividing the corresponding mini-CCE index by 7. If the remainder is 0 or 4, the corresponding mini-CCEs are disposed in the first OFDM symbol. If the remainder is 1 or 5, the corresponding mini-CCEs are disposed in the second OFDM symbol. If the remainder is 2, 3 or 6, corresponding mini-CCE is disposed in the third OFDM symbol.

Time-first indexing uses the characteristic that as a difference between two mini-CCE indexes increases, the corresponding mini-CCEs are spaced farther apart from each other in the frequency domain. Therefore, in later defining a mapping rule, by generating one physical channel with mini-CCEs having a greater index difference, it is possible to maximally obtain frequency diversity gain.

Figures 4, 5:
FIG. 4 is a diagram illustrating mini-CCE indexes in a control resource block #0 for $N_{ant}$=2 and L=3 according to an exemplary embodiment of the present invention.
FIG. 5 is a diagram illustrating mini-CCE indexes in a control resource block #0 for $N_{ant}$=1 and L=3 according to an exemplary embodiment of the present invention.

FIG. 4 illustrates mini-CCE indexes in a control resource block #0 for $N_{ant}=2$ and L=3. A difference from FIG. 2 is that since no RS is defined in the second OFDM symbol, mini-CCEs 301, 303 and 306, which are disposed in the second OFDM symbol, are each composed of 4 REs. The control resource block #0 210 includes a total of 8 mini-CCEs, and is subjected to time-first indexing in the same manner, so that the mini-CCEs of mini-CCE #0 to mini-CCE #7 are indexed in the order of 300, 301, 302, 303, 304, 305, 306 and 307.

FIG. 5 illustrates mini-CCE indexes in a control resource block #0 for $N_{ant}=1$ and L=3. Though only RS0 is needed as only one antenna port is defined, since RS1 is punctured, the positions of and the number of valid REs actually available for mini-CCE generation are equal to the number of valid REs of the case where two antenna ports are defined. Therefore, even though the number of antenna ports is different from the number of antenna ports of FIG. 4, the mini-CCE indexes are equal to the mini CCE indexes of FIG. 4. The mini-CCEs #0 to #7 are indexed in the order of 310, 311, 312, 313, 314, 315, 316 and 317.

Figure 6:
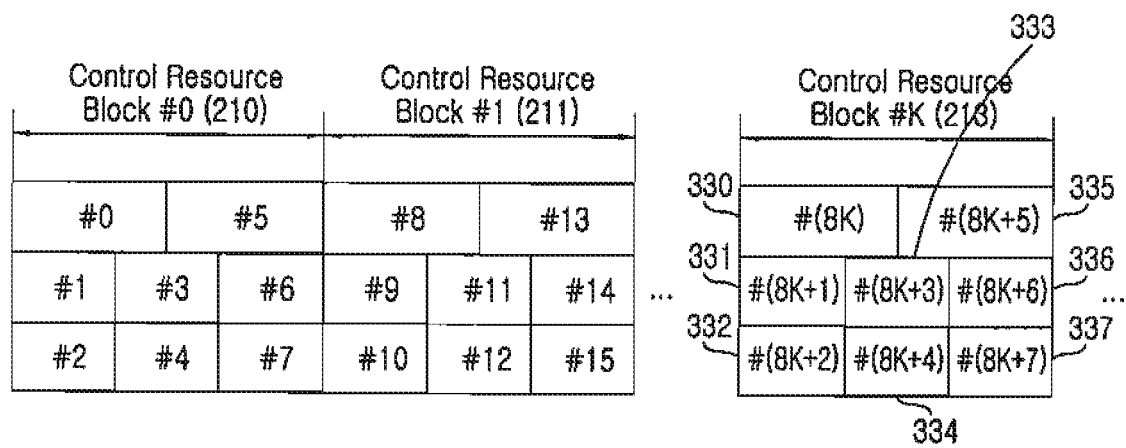
FIG. 6 is a diagram illustrating a control resource block and a mini-CCE indexing method for $N_{ant}$=1 or 2 and L=3 according to an exemplary embodiment of the present invention.

FIG. 6 illustrates a control resource block and a mini-CCE indexing method for $N_{ant}$=1 or 2 and L=3. The mini-CCE indexing method within one control resource block has been introduced in FIGS. 4 and 5, and the method in which mini-CCEs are indexed over the entire system band is described in FIG. 6. Mini-CCE indexes in the control resource block #0 210 are equal to the mini-CCE indexes in FIGS. 4 and 5, and a control resource block #1 211 is also subjected to mini-CCE indexing in the same manner. In a generalized description of mini-CCE indexes, a total of 8 mini-CCEs of mini-CCE #8K to mini-CCE #(8K+7) are defined in a control resource block #K 213 in the order of 330, 331, 332, 333, 334, 335, 336 and 337. Among them, the mini-CCEs 330 and 335 are disposed in the first OFDM symbol, the mini-CCEs 331, 333 and 336 are disposed in the second OFDM symbol, and the mini-CCEs 332, 334, 337 are disposed in the third OFDM symbol. It is possible to determine in which OFDM symbol a particular mini-CCE is disposed, by calculating the remainder obtained by dividing the corresponding mini-CCE index by 8. If the remainder is 0 or 5, the corresponding mini-CCEs are disposed in the first OFDM symbol. If the remainder is 1, 3 or 6, the corresponding mini-CCEs are disposed in the second OFDM symbol. If the remainder is 2, 4 or 7, the corresponding mini-CCEs are disposed in the third OFDM symbol.

Figure 7:
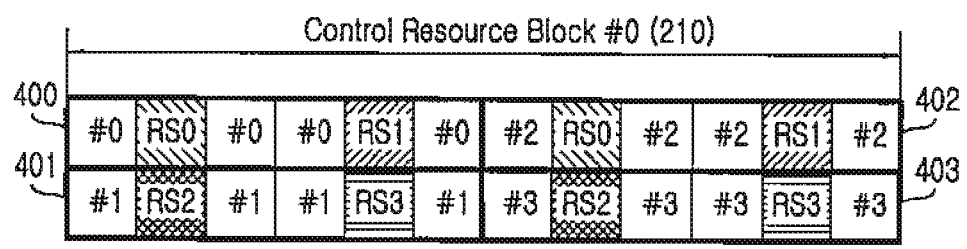
FIG. 7 is a diagram illustrating mini-CCE indexes in a control resource block #0 for $N_{ant}$=4 and L=2 according to an exemplary embodiment of the present invention.

FIG. 7 illustrates mini-CCE indexes in a control resource block #0 for $N_{ant}$=4 and L=2. One control resource block includes 4 mini-CCEs. The control resource block #0 210 is subjected to time-first indexing, and mini-CCEs of mini-CCE #0 to mini-CCE #3 are indexed in the order of 400, 401, 402 and 403. As all mini-CCEs include RSs, it can be noted that the mini-CCEs each are composed of 6 REs.

Figure 8:
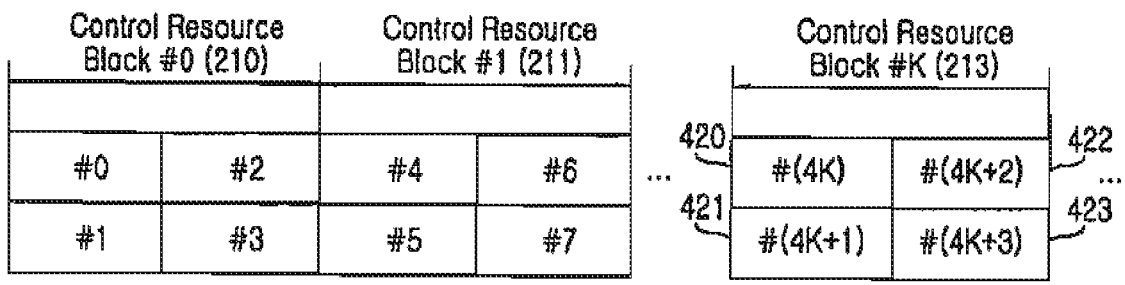
FIG. 8 is a diagram illustrating a control resource block and a mini-CCE indexing method for $N_{ant}$=4 and L=2 according to an exemplary embodiment of the present invention.

FIG. 8 illustrates a control resource block and a mini-CCE indexing method for $N_{ant}$=4 and L=2. The mini-CCE indexing method within one control resource block has been introduced in FIG. 7, and method in which mini-CCEs are indexed over the entire system band is described regarding FIG. 8. Mini-CCE indexes in the control resource block #0 210 are equal to the mini-CCE indexes in FIG. 7, and a control resource block #1 211 is also subjected to mini-CCE indexing in the same manner. In a generalized description of mini-CCE indexes, a total of 4 mini-CCEs of mini-CCE #4K to mini-CCE #(4K+3) are defined in a control resource block #K 213 in the order of 400, 401, 402 and 403. Among the mini CCEs, the mini-CCEs 400 and 402 are disposed in the first OFDM symbol, and the mini-CCEs 401 and 403 are disposed in the second OFDM symbol. It is possible to determine in which OFDM symbol a particular mini-CCE is disposed, by calculating the remainder obtained by dividing the corresponding mini-CCE index by 4. If the remainder is 0 or 2, the corresponding mini-CCEs are disposed in the first OFDM symbol. If the remainder is 1 or 3, the corresponding mini-CCEs are disposed in the second OFDM symbol.

Figure 9:
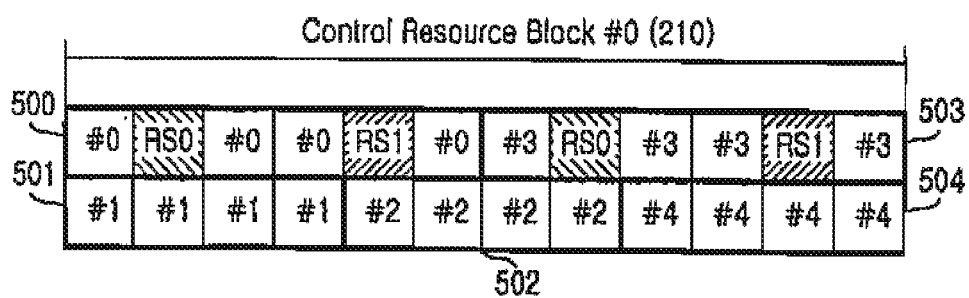
FIG. 9 is a diagram illustrating mini-CCE indexes in a control resource block #0 for $N_{ant}$=2 and L=2 according to an exemplary embodiment of the present invention.

FIG. 9 illustrates mini-CCE indexes in a control resource block #0 for $N_{ant}$=2 and L=2. A difference from FIG. 7 is in that since no RS is defined in the second OFDM symbol, mini-CCEs 501, 502 and 504 disposed in the second OFDM symbol are each composed of 4 REs. The control resource block #0 210 includes a total of 5 mini-CCEs, and is subjected to time-first indexing in the same manner, so that mini-CCEs of mini-CCE #0 to mini-CCE #4 are indexed in the order of 500, 501, 502, 503 and 504.

Figure 10:
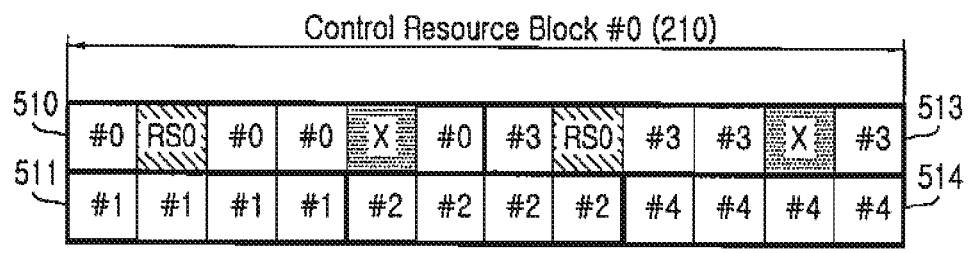
FIG. 10 is a diagram illustrating mini-CCE indexes in a control resource block #0 for $N_{ant}$=1 and L=2 according to an exemplary embodiment of the present invention.

FIG. 10 illustrates mini-CCE indexes in a control resource block #0 for $N_{ant}$=1 and L=2. Though only RS0 is needed as only one antenna port is defined, since RS1 is punctured, the positions of and the number of valid REs actually available for mini-CCE generation are equal to the number of valid REs in the case where two antenna ports are defined. Therefore, even though the number of antenna ports is different from the number of antenna ports of FIG. 9, the mini-CCE indexes are equal to the mini-CCE indexes of FIG. 9. The mini-CCEs of mini-CCE #0 to mini-CCE #4 are indexed in the order of 510, 511, 512, 513 and 514.

Figure 11:
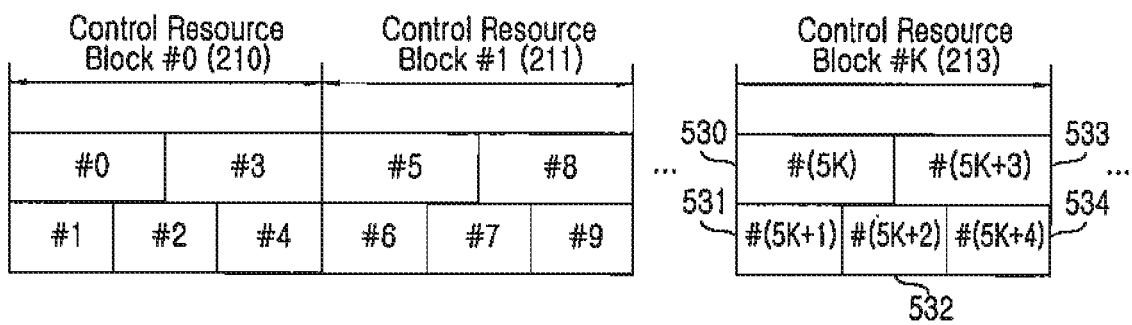
FIG. 11 is a diagram illustrating a control resource block and a mini-CCE indexing method for $N_{ant}$=1 or 2 and L=2 according to an exemplary embodiment of the present invention.

FIG. 11 illustrates a control resource block and a mini-CCE indexing method for $N_{ant}$=1 or 2 and L=2. The mini-CCE indexing method within one control resource block has been introduced in FIGS. 9 and 10, and how mini-CCEs are indexed over the entire system band is described in FIG. 11. Mini-CCE indexes in the control resource block #0 210 are equal to the mini-CCE indexes in FIGS. 9 and 10, and a control resource block #1 211 is also subjected to mini-CCE indexing in the same manner. In a generalized description of mini-CCE indexes, a total of 5 mini-CCEs of mini-CCE #5K to mini-CCE #(5K+4) are defined in a control resource block #K 213 in the order of 530, 531, 532, 533 and 534. Among them, the mini-CCEs 530 and 533 are disposed in the first OFDM symbol, and the mini-CCEs 531, 532, 534 are disposed in the second OFDM symbol. It is possible to determine in which OFDM symbol a particular mini-CCE is disposed, by calculating the remainder obtained by dividing the corresponding mini-CCE index by 5. If the remainder is 0 or 3, the corresponding mini-CCEs are disposed in the first OFDM symbol. If the remainder is 1, 2 or 4, the corresponding mini-CCEs are disposed in the second OFDM symbol.

Figure 12:
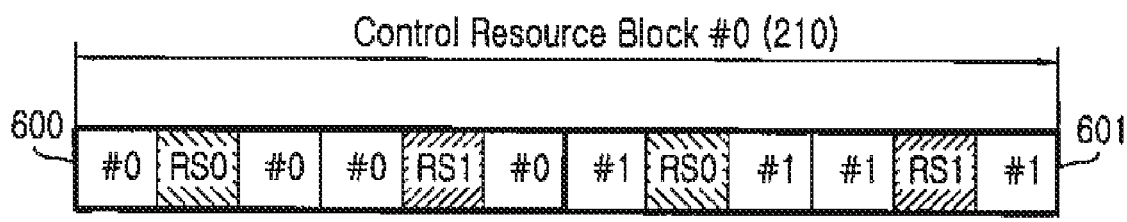
FIG. 12 is a diagram illustrating mini-CCE indexes in a control resource block #0 for $N_{ant}$=2 and L=1 according to an exemplary embodiment of the present invention.

FIG. 12 illustrates mini-CCE indexes in a control resource block #0 for $N_{ant}$=2 and L=1. One control resource block includes 2 mini-CCEs. Since only one OFDM symbol is used for control channel transmission, even though it undergoes time-first indexing, the result is not different from the result obtained when it is simply subjected to indexing on the frequency domain. Mini-CCEs of mini-CCE #0 and mini-CCE #1 are indexed in the order of 600 and 601. It can be appreciated that as all mini-CCEs include RSs, mini-CCEs are both composed of 6 REs.

Figure 13:
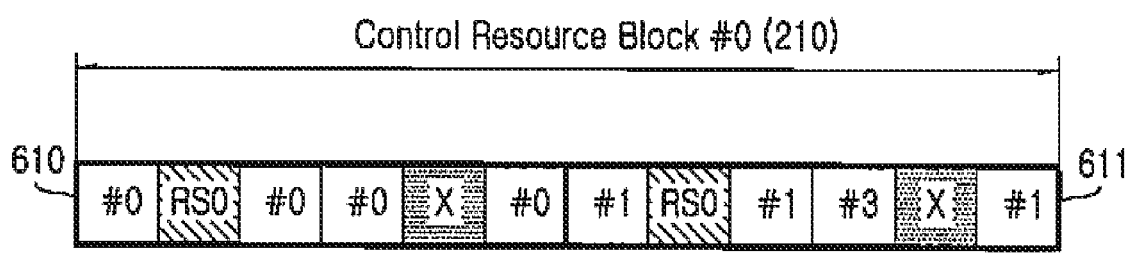
FIG. 13 is a diagram illustrating mini-CCE indexes in a control resource block #0 for $N_{ant}$=1 and L=1 according to an exemplary embodiment of the present invention.

FIG. 13 illustrates mini-CCE indexes in a control resource block #0 for $N_{ant}$=1 and L=1. Although only RS0 is needed as only one antenna port is defined, since RS1 is punctured, the positions of and the number of valid REs actually available for mini-CCE generation are equal to the number of valid REs of the case where two antenna ports are defined. Therefore, even though the number of antenna ports is different from the number of antenna ports of FIG. 12, the mini-CCE indexes are equal to the mini-CCE indexes of FIG. 12. The mini-CCEs of mini-CCE #0 and mini-CCE #1 are indexed in the order of 600 and 601.

Figure 14:
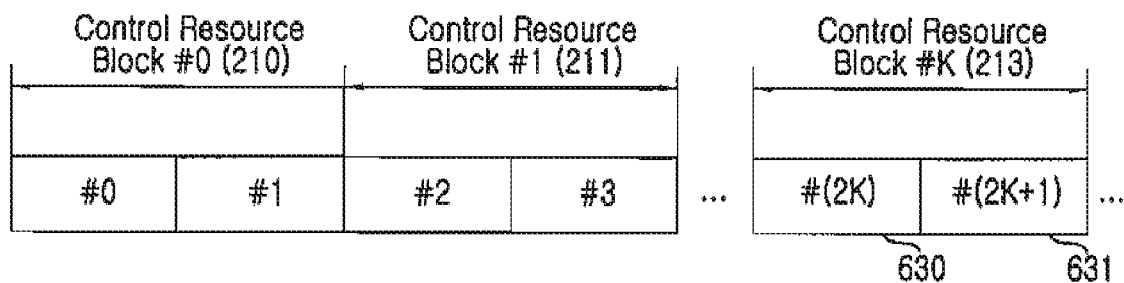
FIG. 14 is a diagram illustrating a control resource block and a mini-CCE indexing method for L=1 according to an exemplary embodiment of the present invention.

FIG. 14 illustrates a control resource block and a mini-CCE indexing method for L=1. The mini-CCE indexing method within one control resource block has been introduced in FIGS. 12 and 13, and method in which mini-CCEs are indexed over the entire system band is described in FIG. 14. Mini-CCE indexes in the control resource block #0 210 are equal to the mini-CCE indexes in FIGS. 12 and 13, and a control resource block #1 211 is also subjected to mini-CCE indexing in the same manner. In a generalized description of mini-CCE indexes, a total of 2 mini-CCEs of mini-CCE #2K and mini-CCE #(2K+1) are defined in a control resource block #K 213 in the order of 630 and 631. Since only one OFDM symbol is used for control channel transmission, even though the OFDM symbol undergoes time-first indexing, the result is not different from the result obtained when the OFDM symbol is simply subject to indexing on the frequency domain. In this case, all mini-CCEs are disposed in the first OFDM symbol.

Mini-CCE indexing is described as follows: A mini-CCE is represented by the first one of REs constituting the mini-CCE, i.e., when k indicates subcarrier indexes on the frequency domain and l indicates OFDM symbol indexes on the time domain, one RE can be expressed with an index (k,l). Further, a mini-CCE is represented by an index (k,l) of its first RE. If an RB, or control resource block, including mini-CCE, starts with RS, an index of an RE representative of the mini-CCE should be changed to (k−1,l). In this condition, an RE with an index (k−1,l) is RS. Mini-CCE indexes are based on time-first indexing, and the mini-CCEs can be indexed by a function f(k,l) that satisfies the above condition. The function f(k,l), a function having, as its input, an RE (k,l) representative of the mini-CCE, indexes the corresponding mini-CCEs according to the values of the corresponding mini-CCEs of f(k,l).

One example of the function f(k,l) is to define f(k,l)=k+1. As described in the above example, if a mini-CCE includes RS, k increases at intervals of 6, and if the mini-CCE includes no RS, k increases at intervals of 4. By contrast, l increases at intervals of 1. Therefore, if the time index l increases by one at the same frequency index k, the value of the time index l is less than a value obtained by increasing the frequency index k by one at the same time index l. Therefore, since the time index-increased mini-CCE is first indexed compared with the frequency index-increased mini-CCE, it is possible to use the function f(k,l)=k+1 for time-first indexing. It is possible to define various other functions f(k,l) that realize time-first indexing. A description of all the functions will be omitted herein.

For some mini-CCEs, even though the functions f(k,l)=k+1 of the mini CCEs use different k and l, the mini-CCEs may show the same outputs. In this case, it is possible to realize the above-described time-first indexing by arranging them such that the mini-CCE with a lower frequency index k has an earlier index.

In brief, in indexing a mini-CCE using an index (k,l) of an RE representing the mini-CCE, the invention introduces a function f(k,l) satisfying the time-first indexing condition, and indexes mini-CCEs so that a mini-CCE with a less value of f(k,l) has an earlier index, and if the value of f(k,l) is equal, a less-k mini-CCE has an earlier index. The RE representative of the mini-CCE can be either included or not included in the mini-CCE. In later resource-mapping, modulation symbol sets are arranged, each of which is composed of 4 modulation symbols in the order of the mini-CCE indexes that underwent the indexing.

Resource Mapping for Physical Channel

The mini-CCE indexing is to index resources ease description of how resource-mapping is performed. In this section, a description will be made as to how a physical channel is mapped to resources after the resources are indexed. The resource-mapping for a physical channel should be performed such that modulation symbols are distributed over the entire system band so as to maximally obtain frequency diversity gain. The present invention proposes, as a resource-mapping method for achieving this goal, a regular-gap resource selection method and a zone-based resource selection method.

Figure 15:
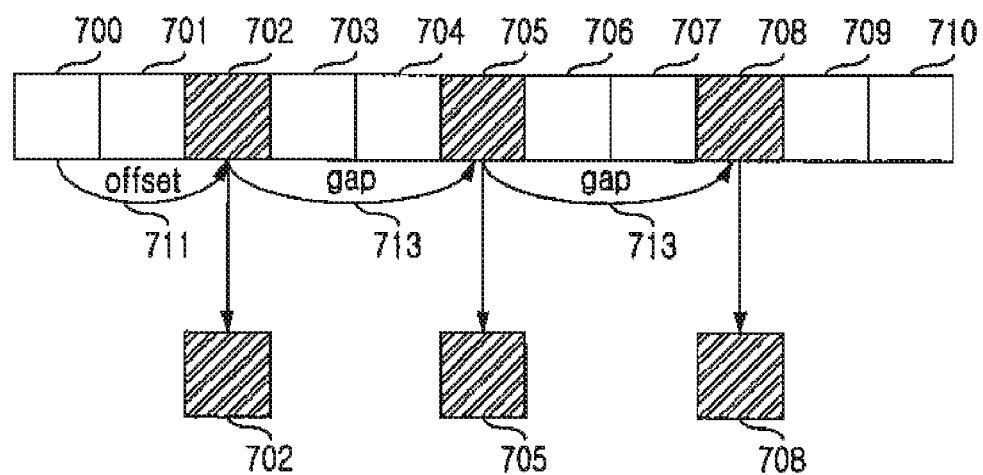
FIG. 15 is a diagram illustrating an embodiment of regular-gap resource selection according to an exemplary embodiment of the present invention.

FIG. 15 illustrates an embodiment of regular-gap resource selection. Reference numerals 700~710 represent individual physical resources. The unit of physical resources can be either an RE or a set of a plurality of adjacent REs. Herein, the unit is a mini-CCE, since the units are physical resources used for control channel transmission, defined by the LTE system. However, if the resource-mapping for a physical channel is applied to a channel of another type, the unit of physical resources can be defined differently. In the embodiment of FIG. 15, a total of 11 mini-CCEs are assumed to be available. In the embodiment of the present invention according to FIG. 15, 3 mini-CCEs are selected from the 11 mini-CCEs and are used for transmission of one physical channel. FIG. 15 illustrates an embodiment of selecting 3 mini-CCEs 702, 705 and 708, and generating one physical channel with the selected mini-CCEs. The selected first mini-CCE 702 is spaced from a mini-CCE #0 by an offset 711, and the selected remaining mini-CCEs 705 and 708 are spaced by a regular gap (interval) 713. This regular-gap resource selection can be mathematically expressed as Equation (1).

$$n_i = \mathrm{mod}(\mathrm{offset} + i \times \mathrm{gap}, N_{total}) \quad (1)$$

In Equation (1), i denotes an order of a selected mini-CCE, and if one physical channel is composed of $N_{phy}$ mini-CCEs, i=0, ..., $N_{phy-1}$. Further, $n_i$ denotes an index of an $i^{th}$-selected mini-CCE. The selected first mini-CCE is an 'offset'-th mini-CCE, and the selected remaining mini-CCEs are mini-CCEs which are spaced by a regular gap. In addition, $N_{total}$ denotes the number of available mini-CCEs, and if the mini-CCE index is greater than or equal to $N_{total}$, a modulo operation is performed so that the mini-CCE may undergo a cyclic shift. Herein, mod(x,y) refers to the remainder obtained by dividing x by y. In order to maximally increase the frequency interval, gap can be determined such that gap=floor($N_{total}/N_{phy}$) or gap=ceil($N_{total}/N_{phy}$). Herein, floor(x) is a floor function used for calculating the maximum integer less than or equal to x, and ceil(x) is a ceiling function used for calculating the minimum integer greater than or equal to x. If the embodiment of FIG. 15 is described with Equation (1), $N_{total}$=11, $N_{phy}$=3, offset=2, and gap=floor($N_{total}/N_{phy}$)=3.

Figure 16:
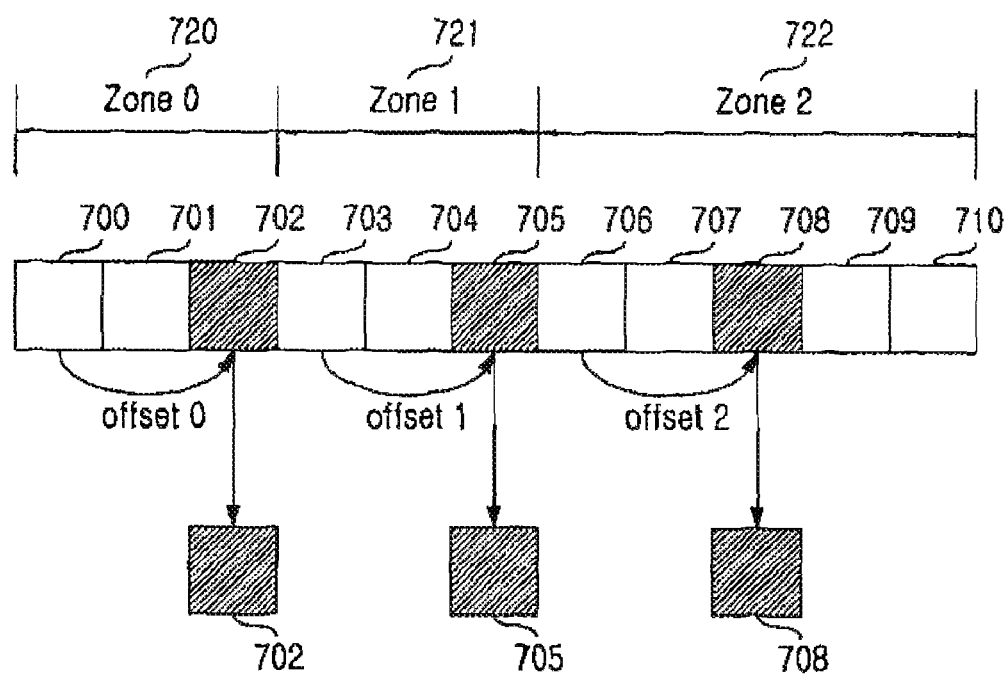
FIG. 16 is a diagram illustrating an embodiment of zone-based resource selection according to an exemplary embodiment of the present invention.

FIG. 16 illustrates an embodiment of zone-based resource selection. A total of 11 available mini-CCEs are divided into 3 zones. A Zone #0 720 is composed of 3 mini-CCEs 700, 701 and 702, a Zone #1 721 is composed of 3 mini-CCEs 703, 704 and 705, and a Zone #2 722 is composed of 5 mini-CCEs 706, 707, 708, 709 and 710. The mini-CCEs 700, 703 and 706 are leading mini-CCEs of the Zone #0 720, the Zone #1 721 and the Zone #2 722, respectively. One physical channel is generated by selecting a mini-CCE, which is spaced from the leading mini-CCE of each zone by a particular offset. FIG. 16 illustrates a method of generating one physical channel by selecting a mini-CCE 702 spaced from the leading mini-CCE 700 by an offset 0 in the Zone #0 720, selecting a mini-CCE 705 spaced from the leading mini-CCE 703 by an offset 1 in the Zone #1 721, and selecting a mini-CCE 708 spaced from the leading mini-CCE 706 by an offset 2 in the Zone #2 722. The zone-based resource selection can be mathematically expressed as Equation (2).

$$n_i = s_i + \Delta_i \quad (2)$$

In Equation (2), i denotes an order of a selected mini-CCE, and if one physical channel is composed of $N_{phy}$ mini-CCEs, i=0, ..., $N_{phy-1}$. Since one mini-CCE is selected from each Zone, the number of Zones should be $N_{phy}$. Further, $s_i$ denotes a leading mini-CCE index of a Zone #i. If a Zone #i is defined with $z_i$ mini-CCEs, $s_0$=0, and $s_i = s_{i-1} + z_{i-1}$ for i=1, ..., $N_{phy-1}$. Additionally, $\Delta_i$ is a value that indicates which mini-CCE is selected from a Zone #i, and $\Delta_i$=mod(offset$_i$, $z_i$). Meanwhile, offset$_i$ is subject to change according to a cell and a subframe by a predetermined rule. If the offset$_i$ is subject to change according to a cell, the resource-mapping is cell-specific mapping, and if the offset, is subject to change according to a subframe, the resource-mapping is zone-based hopping.

The embodiment of FIG. 16 corresponds to the case of applying $z_i$=floor($N_{total}/N_{phy}$)=3 to the Zone #0 720 and the Zone #1 721, and setting the remaining mini-CCE as the Zone #2 722, and this embodiment selects mini-CCEs 702, 705 and 708 by applying offset$_i$=2 for all i.

In generating one physical channel, the zone-based resource selection is characterized by dividing the entire system band into zones with a specific size, the number of which is equal to the number of resources required for generating the physical channel, and by selecting one physical resource from each zone, thereby guaranteeing frequency diversity gain and making it possible to obtain interference diversity gain by changing a resource selection method according to a cell and a subframe. The zone-based resource selection method can define various methods according to how a size $z_i$ of each zone is set, and according to how an offset$_i$ is set in each zone.

Figure 17:
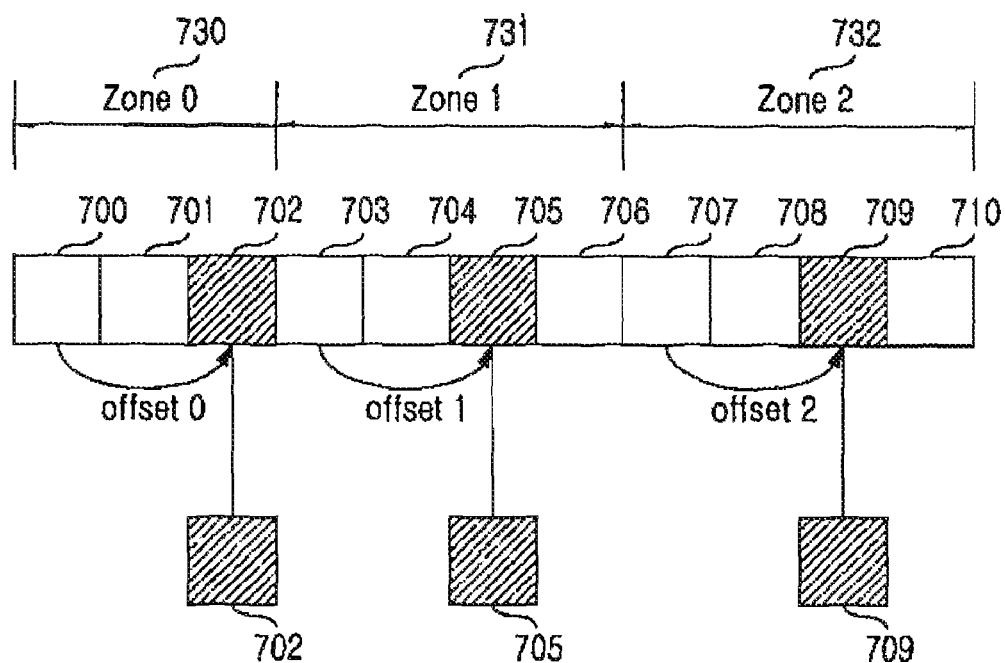
FIG. 17 is a diagram illustrating another embodiment of zone-based resource selection according to an exemplary embodiment of the present invention.

FIG. 17 illustrates another embodiment of zone-based resource selection. In this embodiment, a size of each Zone is determined according to the rule of Equation (3).

$z_i=s_{i+1}-s_i$, where $s_i$=floor($i*N_{totoal}/N_{phy}$) for i=0, . . . , $N_{phy-2}$ and $s_{Nphy}=N_{total}$ That is, $z_i$=floor$((i+1)*N_{totoal}/N_{phy})$-floor$(i*N_{totoal}/N_{phy})$ for i=0, . . . , $N_{phy-2}$ $$z_{Nphy-1}=N_{total}-floor((N_{phy-1})*N_{totoal}/N_{phy}) \quad (3)$$

According to the above rule, a Zone #0 730 is composed of 3 mini-CCEs 700, 701 and 702, a Zone #1 731 is composed of 4 mini-CCEs 703, 704, 705 and 706, and a Zone #2 732 is composed of 4 mini-CCEs 707, 708, 709 and 710. One physical channel is generated by selecting mini-CCEs 702, 705 and 709 by applying offset$_i$=2 for all i.

Resource Mapping for Control Channel

Figure 18:
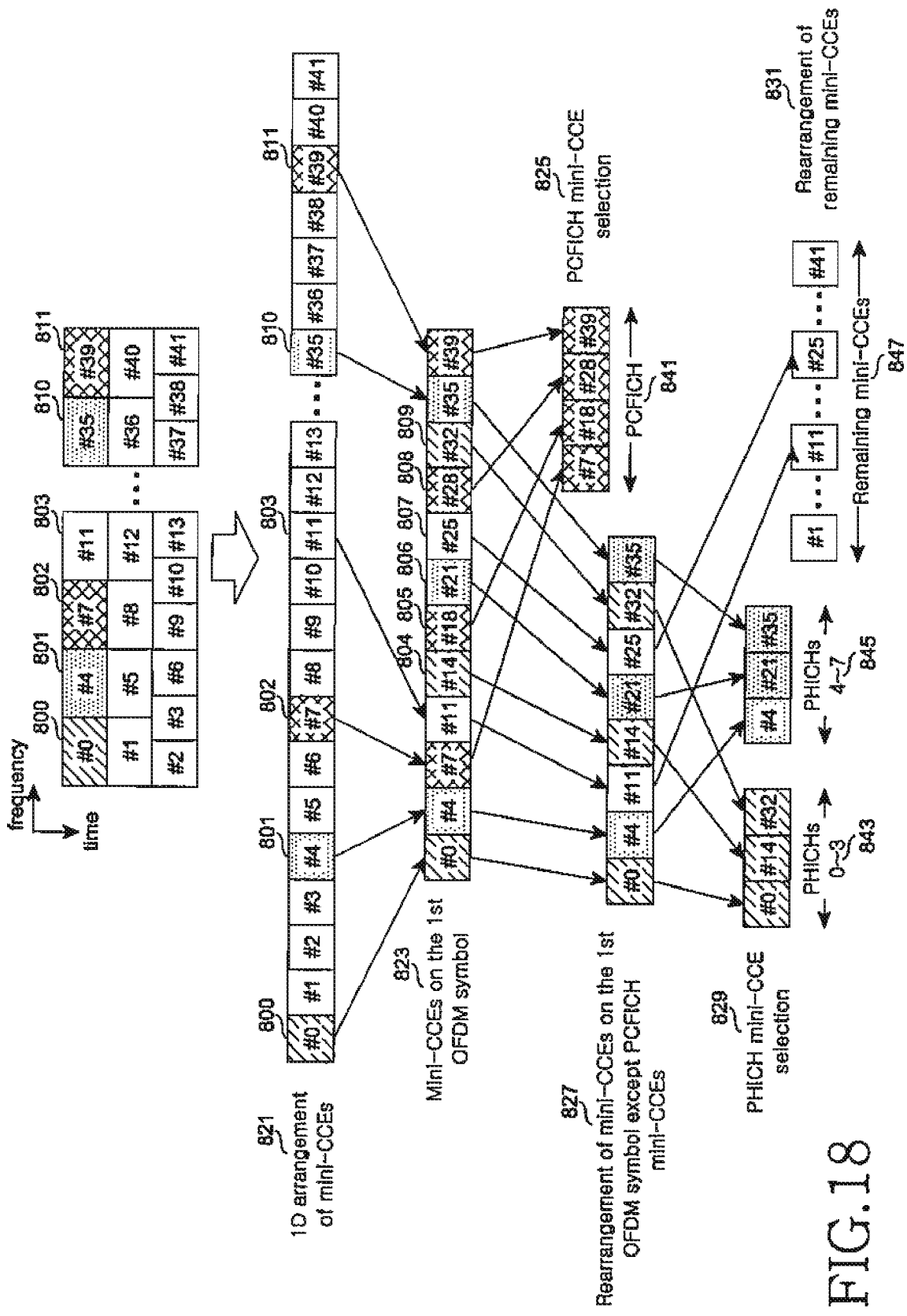
FIG. 18 is a diagram illustrating an embodiment of resource-mapping for a control channel for $N_{ant}$=4, L=3, and $L_{PHICH}$=1 according to an exemplary embodiment of the present invention.

In this section, a resource-mapping method for PCFICH, PHICH and PDCCH, which are downlink control channels defined by the LTE system, based on the mini-CCE indexing and the resource-mapping rule for a physical channel, is described as follows:

FIG. 18 illustrates an embodiment of resource-mapping for a control channel for $N_{ant}$=4, L=3, and $L_{PHICH}$=1. For $N_{ant}$=4 and L=3, mini-CCEs are indexed as shown in FIG. 3. For convenience, in the embodiment of FIG. 18, the number of control resource blocks is assumed to be 6, so that a total of 42 mini-CCEs are defined. If the 42 mini-CCEs are subjected to one-Dimensional (1D) rearrangement in the order of the indexes of the mini-CCEs, the results are as shown by reference numeral 821. Since the PCFICH should be arranged on mini-CCEs of the first OFDM symbol, and the PHICH should also be arranged on mini-CCEs of the first OFDM symbol for $L_{PHICH}$=1, the embodiment should pick out only the mini-CCEs of the first OFDM symbol in order to select mini-CCEs for the PCFICH and mini-CCEs for the PHICH. Reference numeral 823 shows only the mini-CCEs picked out of the first OFDM symbol. Of the 42 mini-CCEs, 12 mini-CCEs #0 800, #4 801, #7 802, #11 803, #14 804, #18 805, #21 806, #25 807, #28 808, #32 809, #35 810 and #39 811, the remainders, obtained by dividing the mini-CCE index by 7, of all of which are 0 or 4, are all disposed in the first OFDM symbol. In the state where only the mini-CCEs of the first OFDM symbol are selected and arranged as shown by reference numeral 823, the mini-CCEs for PCFICH are first selected. Reference numeral 825 shows the mini-CCE #7 802, the mini-CCE #18 805, the mini-CCE #28 808 and the mini-CCE #39 811, which are selected as 4 mini-CCEs ($N_{PCFICH}$=4) for a PCFICH. The process of selecting mini-CCEs for PCFICH is performed according to regular-gap resource selection or zone-based resource selection, which is the resource-mapping rule for a physical channel. In order to generate a PHICH, it is necessary to select mini-CCEs, which are maximally spaced apart from each other on the frequency domain, among the mini-CCEs unused for the PCFICH among the mini-CCEs of the first OFDM symbol. Reference numeral 827 shows mini-CCEs unused for the PCFICH, which are rearranged according to the order of the indexes of the mini-CCEs, among the mini-CCEs of the first OFDM symbol. The process of selecting mini-CCEs for the PHICH is performed according to regular-gap resource selection or zone-based resource selection, which is the resource-mapping rule for a physical channel. Reference numeral 829 shows mini-CCEs selected for the PHICH. Here, PHICHs 0, 1, 2 and 3 (843) are generated by selecting 3 mini-CCEs of the mini-CCE #0 800, the mini-CCE #14 804 and the mini-CCE #32 809 ($N_{PHICH}$=3), and PHICHs 4, 5, 6 and 7 (845) are generated by selecting 3 mini-CCEs of the mini-CCE #4 801, the mini-CCE #21 806 and the mini-CCE #35 810 ($N_{PHICH}$=3). Reference numeral 831 shows 32 mini-CCEs, which are rearranged according to the order of the indexes of the mini-CCEs, except for the mini-CCEs used for PCFICH and PHICH. The embodiment generates CCEs from the remaining mini-CCEs 847, and maps the PDCCH thereto.

Figure 19:
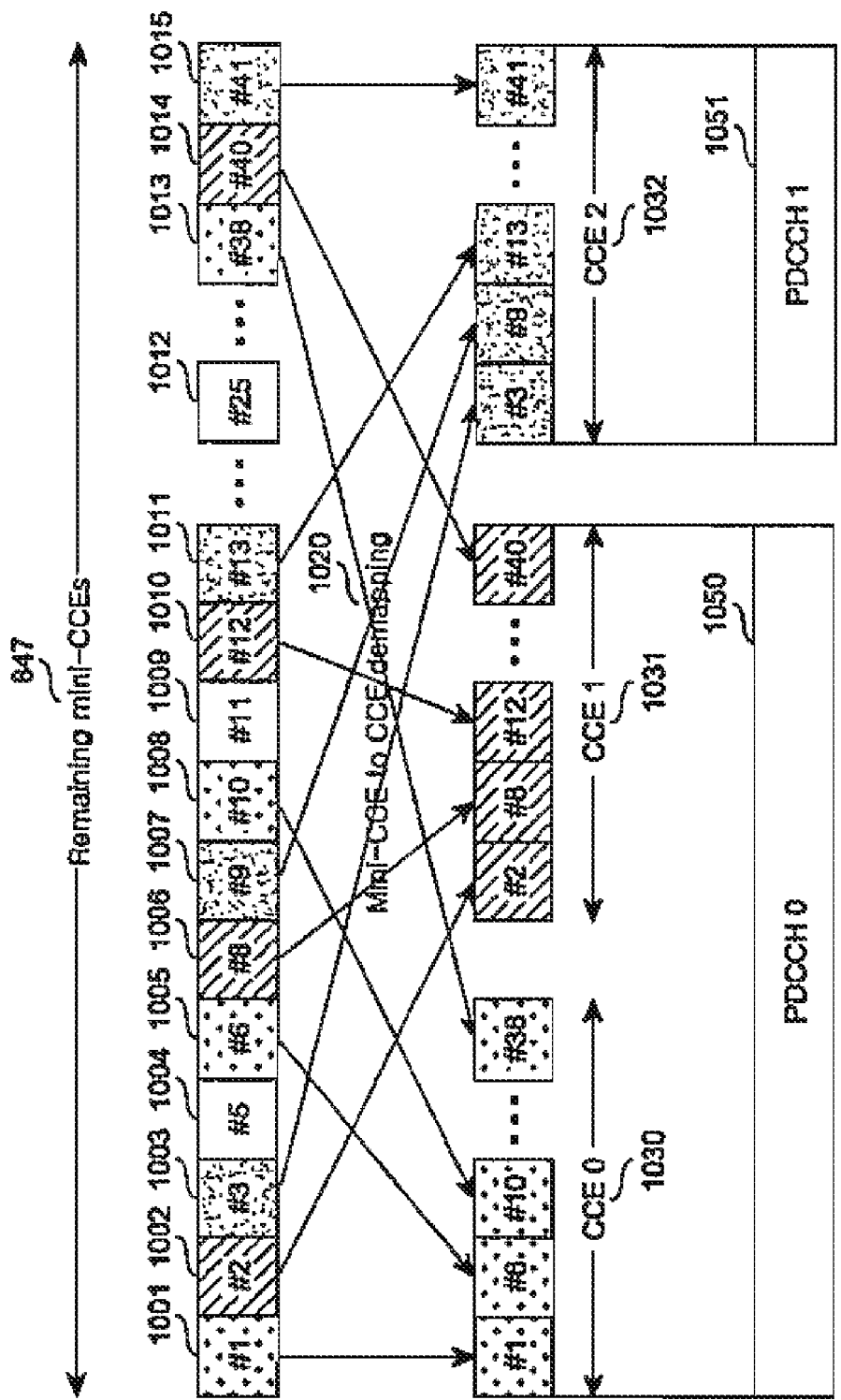
FIG. 19 is a diagram illustrating an embodiment of mapping PCFICH and PHICH, generating CCEs from the remaining mini-CCEs, and mapping PDCCH resources according to an exemplary embodiment of the present invention.

FIG. 19 illustrates an embodiment of mapping the PCFICH and the PHICH, generating CCEs from the remaining mini-CCEs, and mapping the PDCCH resources. Reference numerals 1001~1015 show the remaining mini-CCEs 847, which are rearranged according to the order of the indexes of the mini-CCEs, except for the mini-CCEs, which are selected for the PCFICH and the PHICH in FIG. 18. One CCE is generated by selecting 9 mini-CCEs ($N_{CCE}$=9) according to regular-gap resource selection or zone-based resource selection, which is the resource-mapping rule for a physical channel. A CCE #0 1030, a CCE #1 1031 and a CCE #2 1032 are such selected mini-CCEs. In the embodiment of FIG. 19, a PDCCH #0 1050 is mapped to the CCE #0 1030 and the CCE #1 1031, and transmitted using two 2 CCEs, and a PDCCH #1 1051 is mapped to the CCE #2 1032, and transmitted using 1 CCE. Meanwhile, since 3 CCEs are generated from the remaining 32 mini-CCEs 847, the number of mini-CCEs used for the PDCCH is 27, and 5 mini-CCEs are not used for any control channel. The mini-CCE #5 1004, the mini-CCEs #11 1009 and the mini-CCE #25 1012 represent such mini-CCEs, which are not selected for CCEs.

In mapping the PCFICH and the PHICH, and generating CCEs from the remaining mini-CCEs, if one CCE is generated by selecting mini-CCEs having a great index gap, there is a very high possibility that mini-CCEs constituting individual CCEs will be spaced apart from each other on the frequency domain, making it possible to obtain frequency diversity gain.

Figure 20:
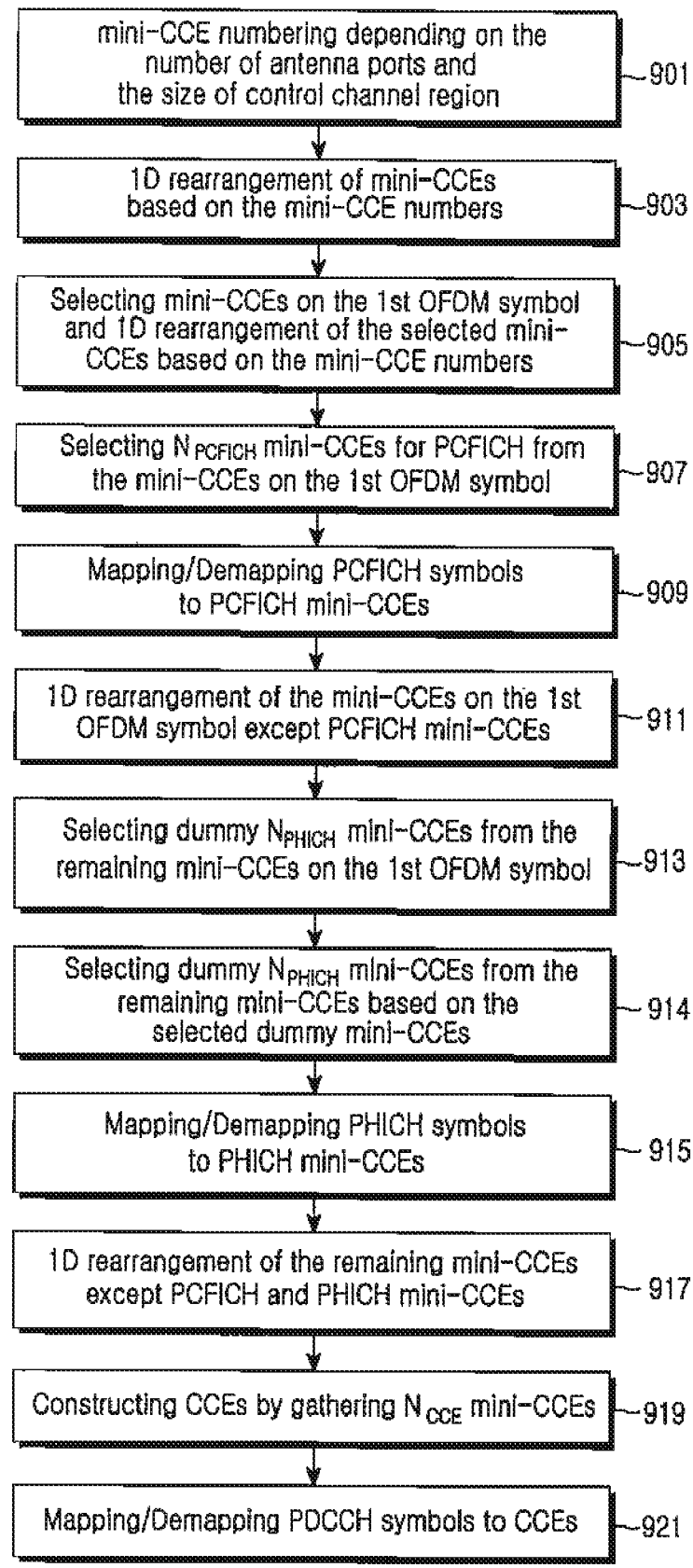
FIG. 20 is a diagram illustrating a flowchart illustrating resource-mapping and demapping for a control channel, proposed by the present invention according to an exemplary embodiment of the present invention.

FIG. 20 illustrates a flowchart illustrating resource-mapping and demapping for a control channel, proposed by the present invention.

In step 901, mini-CCEs are indexed (or numbered). The mini-CCE indexing (or mini-CCE numbering) is performed according to the number $N_{ant}$ of antenna ports and the number L of OFDM symbols used for a control channel, using the rules shown in FIGS. 3, 6, 8, 11, and 14.

Next, in step 903, all mini-CCEs are 1D-rearranged in the order of the indexes of the mini-CCEs determined in step 901.

In step 905, mini-CCEs disposed in the first OFDM symbol are selected and rearranged in the order of the indexes of the mini-CCEs.

In step 907, the embodiment selects $N_{PCFICH}$ mini-CCEs from the mini-CCEs rearranged in step 905. In this process, regular-gap resource selection or zone-based resource selection can be used, which is the resource-mapping rule for a physical channel.

In step 909, a process of a transmission apparatus maps a PCFICH modulation symbol to the mini-CCEs for a PCFICH, selected in step 907, or a process of a reception apparatus demaps the PCFICH modulation symbol from the mini-CCEs for the PCFICH.

In step 911, the embodiment rearranges the mini-CCEs on the first OFDM symbol, except for the mini-CCEs used for the PCFICH, in the order of the indexes of the mini-CCEs.

In step 913, the embodiment selects $N_{PHICH}$ mini-CCEs from the remaining mini-CCEs on the first OFDM symbol. In this process, regular-gap resource selection or zone-based resource selection can be used, which is the resource-mapping rule for a physical channel. The selected mini-CCEs can be directly used as mini-CCEs for the PHICH, or can be used for determining mini-CCEs for the PHICH. If $L_{PHICH}=1$, the mini-CCEs selected in step 913 are directly mapped to the PHICH. However, if $L_{PHICH}=3$, mini-CCEs for the PHICH are not selected only from the first OFDM symbol. In order to guarantee frequency diversity gain, the embodiment first selects $N_{PHICH}$ mini-CCEs spaced apart from each other on the frequency domain in the first OFDM symbol, uses some of the selected mini-CCEs for actual the PHICH, and uses the remaining mini-CCEs as a criterion for determining which mini-CCEs will be selected from another OFDM symbol and use them for the PHICH. According to the mini-CCE indexing rule proposed by the present invention, if an index of a mini-CCE disposed in the first OFDM symbol is increased by one, a mini-CCE disposed in the second OFDM symbol, which uses the same frequency band, can be indicated. If an index of a mini-CCE disposed in the first OFDM symbol is increased by two, a mini-CCE disposed in the third OFDM symbol, which uses the same frequency band, can be indicated. For example, referring to FIG. 2, the mini-CCE #5 205 obtained by increasing an index of the mini-CCE #4 204 disposed on the first OFDM symbol by one, is disposed on the second OFDM symbol, the mini-CCE #6 206 obtained by the index by two is disposed on the third OFDM symbol, and the mini-CCE #4 204, #5 205 and #6 206 all occupy the duplicated frequency band.

In step 914, the embodiment selects mini-CCEs for the PHICH. In selecting mini-CCEs for the PHICH from the remaining, mini-CCEs except for the mini-CCEs for the PCFICH, if $L_{PHICH}=1$, the intact mini-CCEs selected in step 913 are used as mini-CCEs for PCFICH, and if $L_{PHICH}\neq 1$, mini-CCEs for the PHICH based on the mini-CCEs selected in step 913. A detailed description of step 914 will be given with reference to FIGS. 23 and 24.

In step 915, a process within the transmission apparatus maps a PHICH modulation symbol to mini-CCEs for the PHICH, selected in step 914, or a process of the reception apparatus demaps the PHICH modulation symbol from mini-CCEs for the PHICH.

In step 917, the embodiment 1D-rearranges the remaining mini-CCEs except for the mini-CCEs for PCFICH and the mini-CCEs for PHICH, in the order of the indexes of the mini-CCEs.

In step 919, the embodiment generates CCEs by gathering $N_{CCE}$ mini-CCEs. In this process, regular-gap resource selection or zone-based resource selection can be used, which is the resource-mapping rule for a physical channel.

Finally, in step 921, a process within the transmission apparatus maps a PDCCH modulation symbol to the CCEs, or a process of the reception apparatus demaps the PDCCH modulation symbol from the CCEs.

Figure 21:
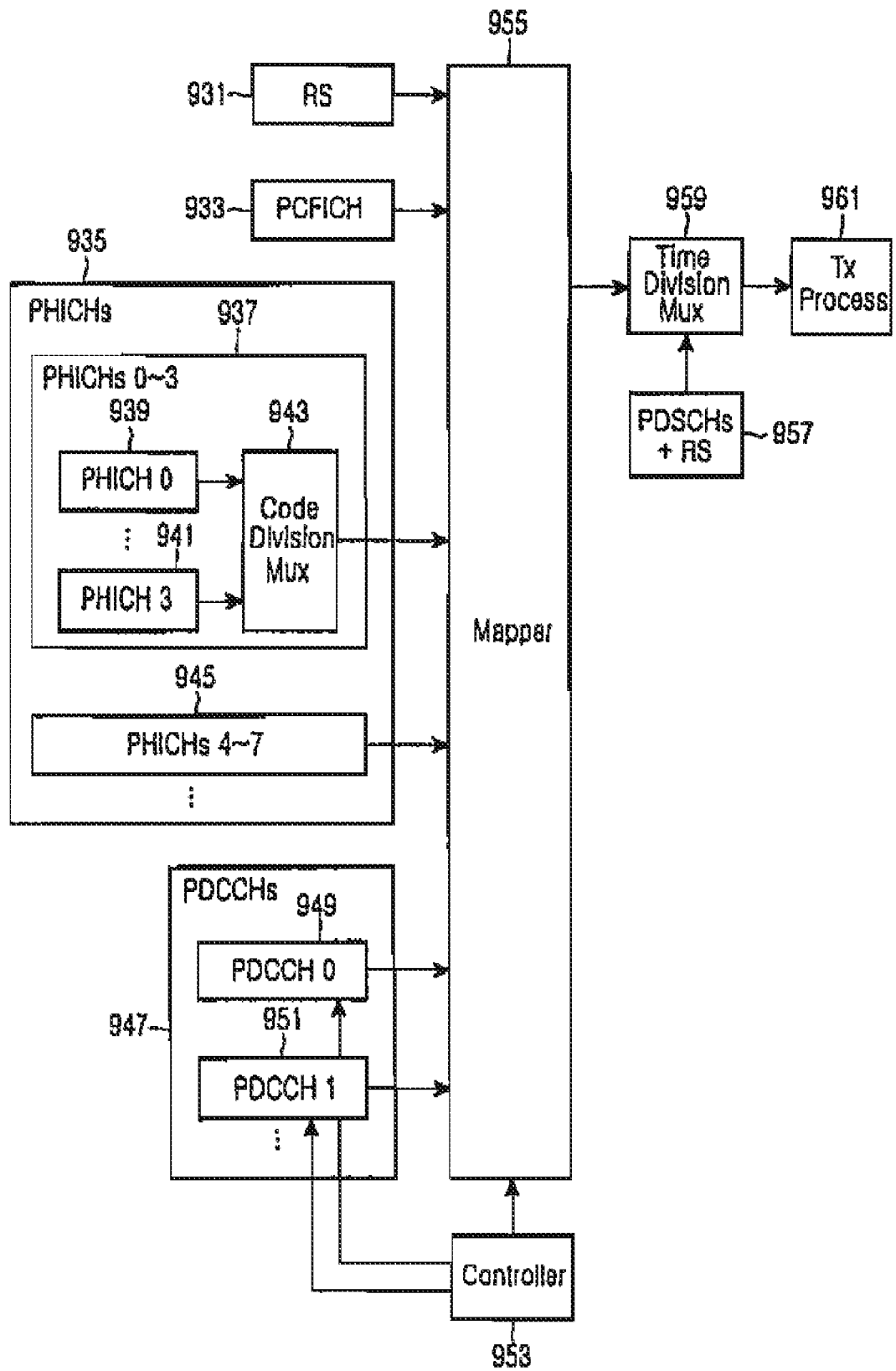
FIG. 21 is a diagram illustrating a transmitter structure of a Node B, to which the resource-mapping proposed by the present invention is applied according to an exemplary embodiment of the present invention.

FIG. 21 illustrates a transmitter structure of a Node B, to which the resource-mapping proposed by the present invention is applied. A controller 953 determines a mapping rule for individual control channels based on cell information and the number of PHICHs, and resource-mapping for control channel and RS according thereto is performed by means of a mapper 955. To the mapper 955 are provided RS from an RS generator 931, a PCFICH modulation signal from a PCFICH signal generator 933, a PHICH modulation signal from a PHICH signal generator 935, and a PDCCH modulation signal from a PDCCH signal generator 947. In the PHICH signal generator 935, 4 PHICHs are gathered from individual PHICH signal generators 939 to 941 and subjected to CDM 943. Reference numerals 937 and 945 represent signal generators for generating 4 PHICH signals of PHICHs 0~3 and PHICHs 4~7, respectively. The PDCCH signal generator 947 includes individual PDCCH signal generators 949 to 951 for generating PDCCH signals to be transmitted to different UEs. The number of CCEs occupied by one PDCCH is determined by the controller 953. The signal to which control channels and RS are mapped is TDM-multiplexed, by a Time Division Multiplexer 959, with a signal 957 to which PDSCHs and RS are multiplexed, and then transmitted through a transmission processing device 961.

Figure 22:
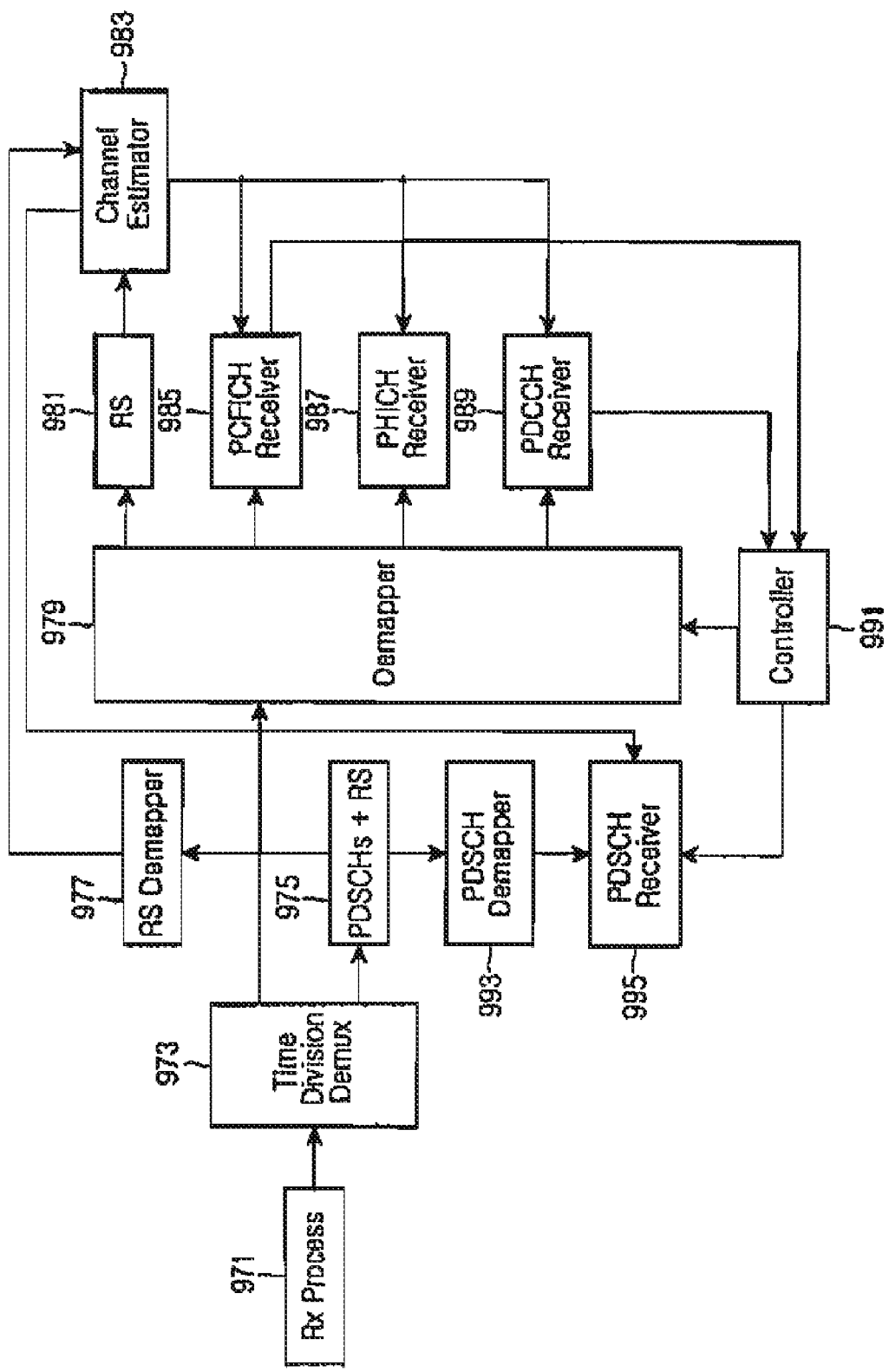
FIG. 22 is a diagram illustrating a UE's receiver structure to which the resource-mapping proposed by the present invention is applied according to an exemplary embodiment of the present invention.

FIG. 22 illustrates a UE's receiver structure to which the resource-mapping proposed by the present invention is applied. As in the transmitter, a controller 991 determines a demapping rule for individual control channels based on cell information and the number of PHICHs, and resource demapping for control channels and RS according thereto is performed by means of a demapper 979. A received signal is first converted into a baseband signal by means of a reception processing device 971, and TDM-demultiplexed, by a Time Division Multiplexer 973, into PDSCHs and RSs on a PDSCH region, and control channels and RSs on a control channel region. Regarding the signal processed by the reception processing device 971, RSs are separated from the PDSCHs and RSs on the PDSCH region by means of an RS demapper 977, and only RSs are separated from the control channels and RS signals on the control channel region by means of the demapper 979 (981). The RSs are provided to a channel estimator 983 where they undergo channel estimation, and the channel estimate is provided to a PDSCH receiver 995, a PCFICH receiver 985, a PHICH receiver 987 and a PDCCH receiver 989, and then used for receiving a PDSCH signal, a PCFCH signal, a PHICH signal and a PDCCH signal, respectively. If the demapper 979 separates a PCFICH modulation symbol stream and provides the results to the PCFICH receiver 985, the PCFICH receiver 985 restores a size L of the control channel region in the corresponding subframe, and the information is provided to the controller 991 and used by the demapper 979 to extract PHICH and PDCCH modulation symbol streams. A PDSCH demapper 993 extracts a PDSCH signal, and provides the PDSCH signal to the PDSCH receiver 995, and the PDSCH receiver 995, under the control of the controller 991, restores data channels using allocation information of the data channels, restored by means of the PDCCH receiver 989.

Figure 23:
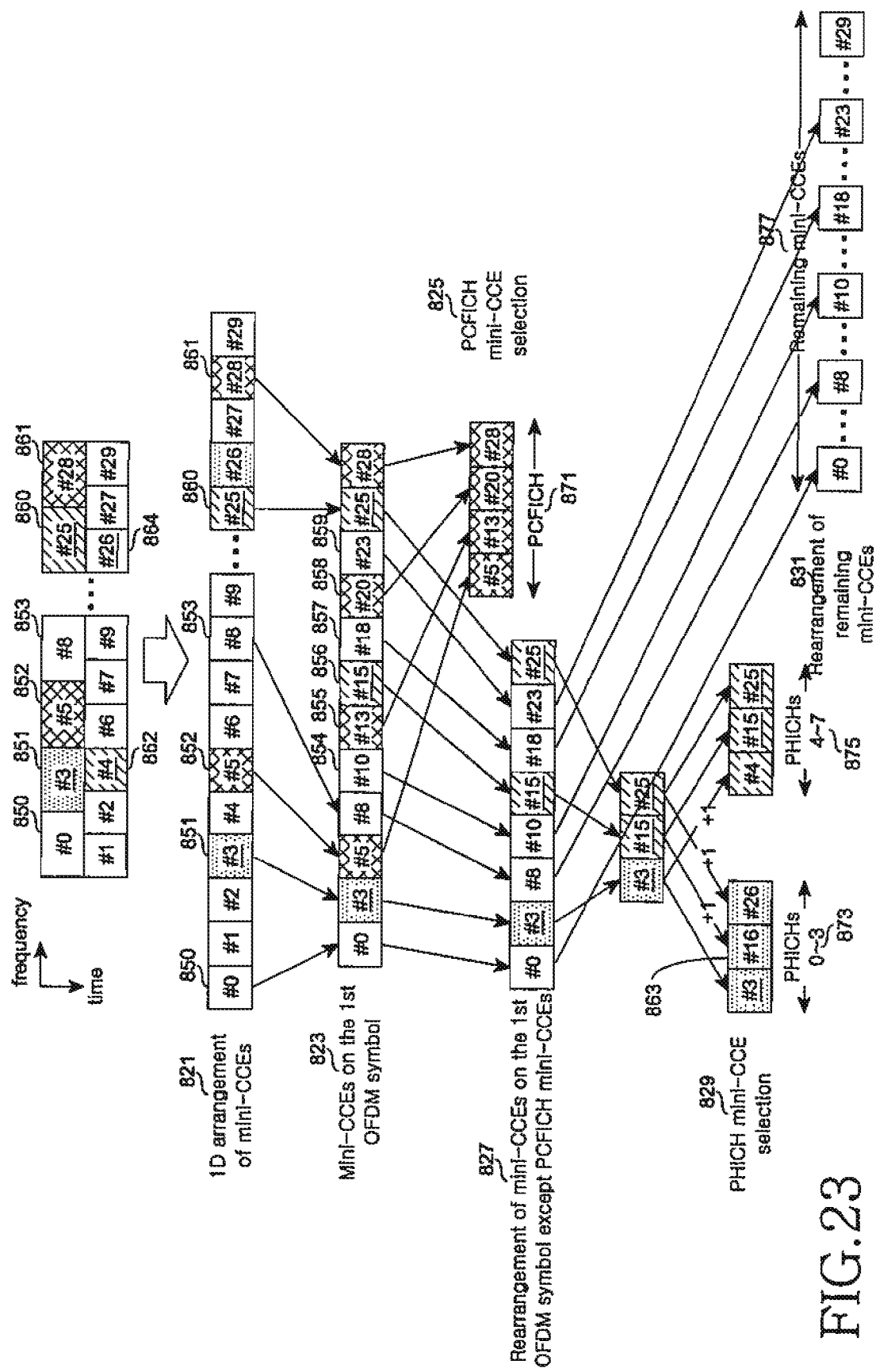
FIG. 23 is a diagram illustrating an embodiment of control channel resource-mapping for $N_{ant}=1$ or 2, L=2, and $L_{PHICH}=2$ according to an exemplary embodiment of the present invention.
Figure 24:
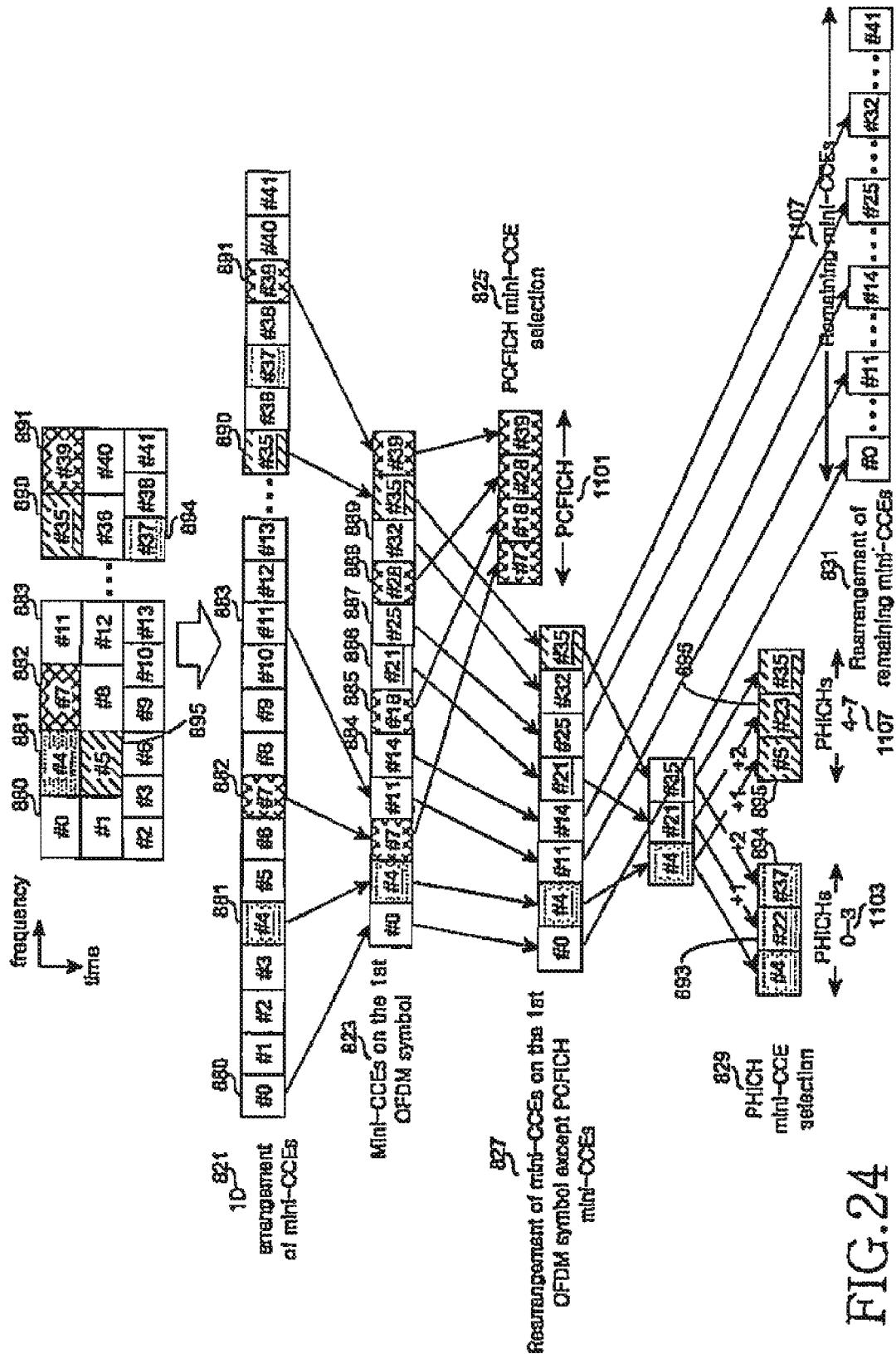
FIG. 24 is a diagram illustrating an embodiment of control channel resource-mapping for $N_{ant}=4$, L=3, and $L_{PHICH}=3$ according to an exemplary embodiment of the present invention.

Several other embodiments will be described in order to determine the manner in which the resource-mapping rule for control channel, proposed by the present invention, will be applied tinder another condition. FIGS. 23 and 24 show the method in which resource-mapping for PHICH is performed, for $L_{PHICH} \neq 1$.

FIG. 23 illustrates an embodiment of control channel resource-mapping for $N_{ant}=1$ or 2, L=2, and $L_{PHICH}=2$. A Multicast Broadcast Single Frequency Network (MBSFN) subframe is a subframe for operating a Single Frequency Network (SFN), and 2 leading OFDM symbols of the subframe are fixed to a control channel and the remaining OFDM symbols are used for SFN transmission. For $L_{PHICH}=1$, the resource-mapping for PHICH, described in the embodiment of FIG. 18, can be applied. For $L_{PHICH} \neq 1$, although generally, $L_{PHICH}=3$, since L=2 especially in the MBSFN subframe, $L_{PHICH}=2$. If $N_{PHICH}=3$, it is necessary to define a rule for determining how 3 mini-CCEs will be selected for $L_{PHICH}=2$. In order to keep the balance of resource consumption and power consumption between OFDM symbols, some PHICHs are generated by selecting 1 mini-CCE from the first OFDM symbol and 2 mini-CCEs from the second OFDM symbol (hereinafter '1+2 selection'), and some PHICHs are generated by selecting 2 mini-CCEs from the first OFDM symbol and 1 mini-CCE from the second OFDM symbol (hereinafter '2+1 selection'), When mini-CCEs for the PHICH are selected in this manner, an additional mapping rule different from the rule described regarding the embodiment of FIG. 18 should be defined. Such an additional rule has been described in steps 913 and 914 of FIG. 20.

For $N_{ant}=1$ or 2, and L=2, the mini-CCEs are indexed as shown in FIG. 11. For convenience, it is assumed in the embodiment of FIG. 23 that the number of control resource blocks is 6, so a total of 30 mini-CCEs are defined. The 30 mini-CCEs are 1D-rearranged in the order of indexes of the mini-CCEs as shown by reference numeral 821. Since the PCFICH should be arranged on mini-CCEs of the first OFDM symbol and a reference mini-CCE for selecting mini-CCEs for PHICH should also be selected from the mini-CCEs of the first OFDM symbol, only the mini-CCEs of the first OFDM symbol should be picked out in order to select mini-CCEs for the PCFICH and dummy mini-CCEs for PHICH. Reference numeral 823 shows only the mini-CCEs picked out of the first OFDM symbol. Of the 30 mini-CCEs, 12 mini-CCEs mini-CCE #0 850, #3 851, #5 852, #8 853, #10 854, #13 855, #15 856, #18 857, #20 858, #23 859, #25 860 and #28 861, the remainders, obtained by dividing the mini-CCE index by 5, of all of which are 0 or 3, are all disposed in the first OFDM symbol. In the state where only the mini-CCEs of the first OFDM symbol are selected and arranged as shown by reference numeral 823, the mini-CCEs for the PCFICH are first selected. Reference numeral 825 shows the mini-CCE #5 852, the mini-CCE #13 855, the mini-CCE #20 858 and the mini-CCE #28 861, which are selected as 4 mini-CCEs ($N_{PCFICH}=4$) for the PCFICH. The process of selecting mini-CCEs for the PCFICH is performed according to regular-gap resource selection or zone-based resource selection, which is the resource-mapping rule for a physical channel. For reference, since L is fixed to 2 in the MBSFN subframe, the PCFICH may not be needed. Though such an exception has not yet been defined in the LTE system, if the PCFICH is not transmitted only for the MBSFN subframe, the PCFICH mini-CCE selection, step 825, and its associated steps 907 and 909 of FIG. 20 can be omitted.

In order to generate the PHICH, it is necessary to select mini-CCEs that are maximally spaced apart from each other on the frequency domain, among the mini-CCEs unused for the PCFICH among the mini-CCEs of the first OFDM symbol. The selected mini-CCEs are not directly used for the PHICH, but are used as a criterion for selecting mini-CCEs for the PHICH. Assume that such mini-CCEs are dummy mini-CCEs for PHICH mapping. Reference numeral 827 shows mini-CCEs unused for the PCFICH, which are rearranged in the order of the indexes of the mini-CCEs, among the mini-CCEs of the first OFDM symbol. The process of selecting dummy mini-CCEs for PHICH mapping is performed according to regular-gap resource selection or zone-based resource selection, which is the resource-mapping rule for a physical channel. The mini-CCE #3 851, the mini-CCE #15 856 and the mini-CCE #25 860 are selected as dummy mini-CCEs for PHICH mapping, and all of the mini-CCEs 851, 856 and 860 are disposed on the first OFDM symbol. Reference numeral 829 shows mini-CCEs selected for the PHICH. Here, PHICHs 0, 1, 2 and 3 (873) are generated by selecting 3 mini-CCEs of the mini-CCE #3 851, the mini-CCE #16 863 and the mini-CCE #26 864 ($N_{PHICH}=3$), and PHICHs 4, 5, 6 and 7 (875) are generated by selecting 3 mini-CCEs of the mini-CCE #4 862, the mini-CCE #15 856 and the mini-CCE #25 860 ($N_{PHICH}=3$).

In a detailed description of the process of selecting mini-CCEs for PHICH, the mini-CCE #3 851 disposed on the first OFDM symbol among the dummy mini-CCEs for PHICH mapping is used for mapping PHICHs 0, 1, 2 and 3 (873). If the PHICHs 0, 1, 2 and 3 (873) are generated in a "1+2 selection" manner, the remaining two mini-CCEs should be selected from the second OFDM symbol. Therefore, the mini-CCE #15 856, which is the remaining dummy mini-CCE for PHICH mapping, the mini-CCE #16 863 and the mini-CCE #26 864, which are obtained by increasing the index of the mini-CCE #25 860 by one, are used for mapping the PHICHs 0, 1, 2 and 3 (873). As described above, according to the mini-CCE indexing rule proposed by the present invention, if an index of a mini-CCE is increased by one, a mini-CCE disposed on the same frequency band can be indicated in the next OFDM symbol. Since the dummy mini-CCEs for the PHICH, selected from the first OFDM symbol, have already been selected as mini-CCEs which are spaced as far as possible on the frequency domain, the selection guarantees that the mini-CCEs of the second OFDM symbol, selected after increasing indexes of the mini-CCEs, are also spaced apart from each other on the frequency domain, making it possible to obtain the same frequency diversity gain. Meanwhile, the mini-CCE #15 856 and the mini-CCE #25 860 disposed on the first OFDM symbol among the dummy mini-CCEs for PHICH mapping, are used for mapping the PHICHs 4, 5, 6 and 7 (875). Since the PHICHs 0, 1, 2 and 3 (873) are generated in a "1+2 selection" manner, the PHICHs 4, 5, 6 and 7 (875) are generated in a "2+1 selection" manner. This is to keep the balance of resource consumption and power consumption between OFDM symbols. Since 2 mini-CCEs are selected from the first OFDM symbol, 1 mini-CCE is selected from the second OFDM symbol. To this end, the mini-CCE #4 862, which is obtained by increasing by one the index of the mini-CCE #3 851 used for the PHICHs 0, 1, 2 and 3 (873), is selected as a mini-CCE for the PHICHs 4, 5, 6 and 7 (875). Accordingly, the PHICHs 0, 1, 2 and 3 (873) are mapped to the mini-CCE #3 851, the mini-CCE #16 863, and the mini-CCE #26 864, and the PHICHs 4, 5, 6 and 7 (875) are mapped to the mini-CCE #4 862, the mini-CCE #15 856 and the mini-CCE #25 860.

In summary, if dummy mini-CCEs #A, #B and #C for PHICH mapping are selected, PHICHs a~a+3 are mapped to mini-CCEs #A, #(B+1) and #(C+1), and PHICHs a+4~a+7 are mapped to mini-CCEs #(A+1), #B and #C. In this way, the PHICHs a~a+3 are generated in a "1+2 selection" manner, and the PHICHs a+4~a+7 are generated in a "2+1 selection" manner. When there is a need for additional PHICHs, mini- CCEs for PHICH mapping are selected by selecting other dummy mini-CCEs and repeating the same process.

In an alternative method, if dummy mini-CCEs #A, #B and #C for PHICH mapping are selected, PHICHs a~a+3 are mapped to mini-CCEs #A, #(B+1) and #C, and PHICHs a+4~a+7 are mapped to mini-CCEs #(A+1), #B and #(C+1). In this way, the PHICHs a~a+3 are generated in a "2+1 selection" manner, and the PHICHs a+4~a+7 are generated in a "1+2 selection" manner.

Reference numeral 831 shows 20 mini-CCEs, which are rearranged in the order of the indexes of the mini-CCEs, except for the mini-CCEs used for the PCFICHs and PHICHs. The embodiment generates CCEs from the remaining mini-CCEs 877, and maps the PDCCHs thereto.

FIG. 24 illustrates an embodiment of control channel resource-mapping for $N_{ant}=4$, $L=3$, and $L_{PHICH}=3$. If $L_{PHICH}=3$ and $N_{PHICH}=3$, the embodiment should generate PHICH by selecting one mini-CCE from each OFDM symbol. Even the mini-CCEs selected from different OFDM symbols should be selected such that the selected mini-CCEs are maximally spaced apart from each other on the frequency domain, in order to obtain frequency diversity gain.

For $N_{ant}=4$ and $L=3$, mini-CCEs are indexed as shown in FIG. 3. For convenience, it is assumed in the embodiment of FIG. 24 that the number of control resource blocks is 6, so a total of 42 mini-CCEs are defined. If the 42 mini-CCEs are subjected to 1D rearrangement in the order of the indexes of the mini-CCEs, the results are as shown by reference numeral 821. Since the PCFICH should be arranged on mini-CCEs of the first OFDM symbol, and the PHICH should also be arranged on mini-CCEs of the first OFDM symbol for $L_{PHICH}=1$, the embodiment should pick out only the mini-CCEs of the first OFDM symbol in order to select mini-CCEs for the PCFICH and mini-CCEs for the PHICH. Reference numeral 823 shows only the mini-CCEs picked out of the first OFDM symbol. Of the 42 mini-CCEs, 12 mini-CCEs #0 880, #4 881, #7 882, #11 883, #14 884, #18 885, #21 886, #25 887, #28 888, #32 889, #35 890 and #39 891, the remainders, obtained by dividing the mini-CCE index by 7, of all of which are 0 or 4, are all disposed in the first OFDM symbol. In the state where only the mini-CCEs of the first OFDM symbol are selected and arranged as shown by reference numeral 823, the mini-CCEs for the PCFICH are first selected. Reference numeral 825 shows the mini-CCE #7 882, the mini-CCE #18 885, the mini-CCE #28 888 and the mini-CCE #39 891, which are selected as 4 mini-CCEs ($N_{PCFICH}=4$) for the PCFICH. The process of selecting mini-CCEs for the PCFICH is performed according to regular-gap resource selection or zone-based resource selection, which is the resource-mapping rule for a physical channel. For reference, since $L_{PHICH}$ is fixed to 3, it cannot but use 3 leading OFDM symbols for control channel transmission. Therefore, CCFI information is meaningless, and the PCFICH may not be needed. Though such an exception has not yet been defined in the LTE system, if the PCFICH is not transmitted only for $L_{PHICH}=3$, the PCFICH mini-CCE selection (825) and its associated steps 907 and 909 of FIG. 20 can be omitted.

In order to generate PHICH, it is necessary to select, as dummy mini-CCEs for the PHICH, mini-CCEs which are maximally spaced apart from each other on the frequency domain, among the mini-CCEs unused for PCFICH among the mini-CCEs of the first OFDM symbol Reference numeral 827 shows mini-CCEs unused for the PCFICH, which are rearranged in the order of the indexes of the mini-CCEs, among the mini-CCEs of the first OFDM symbol. The process of selecting dummy mini-CCEs for PHICH mapping is performed according to regular-gap resource selection or zone-based resource selection, which is the resource-mapping rule for a physical channel. The mini-CCE #4 881, the mini-CCE #21 886, the mini-CCE #35 890 are selected as dummy mini-CCEs for PHICH mapping, and all of the mini-CCEs 881, 886 and 890 are disposed on the first OFDM symbol. Reference numeral 829 shows mini-CCEs selected for PHICH. Here, PHICHs 0, 1, 2 and 3 (1103) are generated by selecting 3 mini-CCEs of the mini-CCE #4 881, the mini-CCE #22 893 and the mini-CCE #37 894, and PHICHs 4, 5, 6 and 7 (1105) are generated by selecting 3 mini-CCEs of the mini-CCE #5 895, the mini-CCE #23 896 and the mini-CCE #35 890.

In a detailed description of the process of selecting mini-CCEs for the PHICH, the mini-CCE #4 881 disposed on the first OFDM symbol among the dummy mini-CCEs for PHICH mapping is used for mapping PHICHs 0, 1, 2 and 3 (1103). The mini-CCE #22 893, which is obtained by increasing by one an index of the mini-CCE #21 886, which is a dummy mini-CCE for PHICH mapping, in order to select one mini-CCE from the second OFDM symbol, is used for mapping the PHICHs 0, 1, 2 and 3 (1103). The mini-CCE #37 894, which is obtained by increasing by two an index of the mini-CCE #35 890, which is a dummy mini-CCE for PHICH mapping, in order to select one mini-CCE from the third OFDM symbol, is used for mapping the PHICHs 0, 1, 2 and 3 (1103). Therefore, the PHICHs 0, 1, 2 and 3 (1103) are generated by selecting 3 mini-CCEs of the mini-CCE #4 881, the mini-CCE #22 893, and the mini-CCE #37 894. Meanwhile, the mini-CCE #35 890 disposed in the first OFDM symbol among the dummy mini-CCEs for PHICH mapping, is used for mapping the PHICHs 4, 5, 6 and 7 (1105). The mini-CCE #5 895, which is obtained by increasing by one the index of the mini-CCE #4 881, which is a dummy mini-CCE for PHICH mapping, in order to select one mini-CCE from the second OFDM symbol, is used for mapping the PHICHs 4, 5, 6 and 7 (1105). Further, the mini-CCE #23 896, which is obtained by increasing by two the index of the mini-CCE #21 886, which is a dummy mini-CCE for PHICH mapping, in order to select one mini-CCE from the third OFDM symbol, is used for mapping the PHICHs 4, 5, 6 and 7 (1105). Therefore, the PHICHs 4, 5, 6 and 7 (1105) are generated by selecting 3 mini-CCEs of the mini-CCE #5 895, the mini-CCE #23 896 and the mini-CCE #35 890.

In summary, if dummy mini-CCEs #A, #B and #C for PHICH mapping are selected, PHICHs a~a+3 are mapped to mini-CCEs #A, #(B+1) and #(C+2), PHICHs a+4~a+7 are mapped to mini-CCEs #(A+1), #(B+2) and #C, and PHICHs a+8~a+11 are mapped to mini-CCEs #(A+2), #B and #(C+1). In this way, one mini-CCE can be selected from each OFDM symbol such that the selected mini-CCEs are spaced apart from each other on the frequency domain. When additional PHICHs are needed, mini-CCEs for PHICH mapping are selected by selecting other dummy mini-CCEs and repeating the same process.

Reference numeral 831 shows 32 mini-CCEs, which are rearranged in the order of the indexes of the mini-CCEs, except for the mini-CCEs used for the PCFICH and the PHICH. The embodiment generates CCEs from the remaining mini-CCEs 1107, and maps the PDCCH thereto.

Mathematically expressing a PHICH mapping method according to arbitrary $L_{PHICH}$ helps facilitate realization of the method. A method for mathematically expressing the PHICH mapping method is described as follows:

First, a PHICH group should be defined. As described above with reference to the accompanying drawings, multiple PHICHs are transmitted after undergoing CDM. A set of PHICHs, which are CDM-multiplexed on the same physical resources, is defined as a PHICH group. If 4 PHICHs are transmitted after undergoing CDM, PHICH a, PHICH a+1, PHICH a+2 and PHICH a+3 constitute one PHICH group. Additionally, if In-phase/Quadrature-phase (I/Q) multiplexing is applied that transmits different PHICHs on a real component and an imaginary component, 8 PHICHs are subjected to CDM, and PHICH a~PHICH a+7 constitute one PHICH group. A PHICH group index g is a value indicating in which PHICH group a given PHICH is CDM-multiplexed. If a PHICH index is given as p, a PHICH group index can be calculated using Equation (4).

$$g = \text{floor}(p/\text{PHICH\_GROUP\_SIZE}) \quad (4)$$

where PHICH_3GROUP_SIZE is a value indicating how many PHICHs are CDM-multiplexed to one PHICH group. When I/Q multiplexing is applied, PHICH_GROUP_SIZE is 8, and otherwise, PHICH_GROUP_SIZE is 4.

Physical resources corresponding to one mini-CCE are enough to transmit a CDM-multiplexed PHICH group. However, in order to obtain frequency diversity gain, the PHICH group is repeatedly transmitted on the frequency domain $N_{PHICH}$ times, i.e., $N_{PHICH}$ mini-CCEs are used for transmitting one PHICH group. If $N_{PHICH}=3$, the PHICH group is repeatedly transmitted using 3 mini-CCEs. A repetition index is defined by indexing mini-CCEs that transmit one PHICH group, and the repetition index r has a value of 0, 1, . . . , $N_{PHICH}-1$.

For mapping of PHICHs belonging to a PHICH group g, if $A_0(g,0), \#A_0(g,1), \ldots, \#A_0(g,N_{PHICH}-1)$ disposed on the first OFDM symbol are selected as dummy mini-CCEs, the mini-CCEs to which PHICHs are actually mapped according to $L_{PHICH}$, PHICH group index g, and repetition index r, are $\#A(g,0), A(g,1), \ldots, \#A(g,N_{PHICH}-1)$, and $A(g,r)$ is calculated using Equation (5).

$$A(g,r) = A_0(g,r) + \mathrm{mod}(g+r, L_{PHICH}) \quad (5)$$

In this manner, the PHICH mapping method can be mathematically expressed according to arbitrary $L_{PHICH}$. For example, if $L_{PHICH}=1$, $\#A_0(g,0)$, $\#A_0(g,1)$, . . . , $\#A_0(g,N_{PHICH}-1)$ are mini-CCEs for PHICH mapping. In this case, since $\mathrm{mod}(g+r, L_{PHICH})$ becomes 0 regardless of a value of g and r, a desired operation is performed. In addition, if $L_{PHICH}=2$ or 3, operations of FIGS. 23 and 24 are equally performed.

As is apparent from the foregoing description, according to the present invention, the OFDM-based mobile communication system can perform resource allocation for a control channel in a time-first manner, thereby improving diversity gain.

In the present invention, the resource-mapping for a control channel is performed by a process of allocating a group of REs, i.e., mini-CCE resources, existing on the 2D domain in a time-first manner using the mini-CCE indexing rule, and selecting resources of individual control channels according to the resource-mapping rule for a physical channel. The resource-mapping process for a physical channel generates one physical channel by selecting physical resources having a greater index gap if possible, and since mini-CCEs are indexed such that as an index gap is greater, the resources are spaced far apart from each other on the frequency domain, it is possible to maximally obtain frequency diversity. Additionally, through the process of first selecting mini-CCEs for the PCFICH, selecting mini-CCEs for the PHICH from the remaining mini-CCEs, generating CCEs using the remaining mini-CCEs, and using them for the PDCCH, it is possible to guarantee that mini-CCEs occupied by individual control channels do not collide with each oilier, i.e., the mini-CCEs are not repeatedly defined.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a downlink control channel in mobile communication system using Orthogonal Frequency Division Multiplexing (OFDM), the method comprising the steps of:
    mapping the downlink control channel to Resource Elements (REs), wherein the downlink control channel comprises a plurality of RE groups;
    transmitting downlink control information via the mapped downlink control channel;
    wherein each of the plurality of RE groups comprises four REs, and each RE group has a single time index; and
    wherein the plurality of RE groups are allocated to available resources in the downlink control channel in a time first manner, wherein the available resources are divided into a two-dimensional frequency/time structure, and wherein, during allocation, a time index is increased from an initial value up to a predetermined value in a given frequency index, before increasing to a next frequency index and resetting the time index to the initial value.

2. The method of claim 1, wherein at least one of the plurality of RE groups comprises an RE for transmission of a reference signal used for channel estimation.

3. The method of claim 2, wherein the at least one of the plurality of RE groups that comprises the RE for transmission of the reference signal has a number of allocated REs that is greater than four.

4. The method of claim 1, wherein the downlink control channel is a Packet Dedicated Control Channel (PDCCH) and the plurality of RE groups are not assigned a Physical Channel Format Indication Channel (PCFICH) or a Physical Hybrid Automatic Repeat reQuest (H-ARO) Indicator Channel (PHICH).

5. The method of claim 1, further comprising transmitting information associated with the available resources.

6. The method of claim 1, wherein the predetermined value is a number of OFDM symbols used for transmission of the downlink control channel.

7. The method of claim 1, wherein a time index of a first RE in a given RE group is the single time index for the given RE group.

8. An apparatus for transmitting a downlink control channel in a mobile communication system using Orthogonal Frequency Division Multiplexing (OFDM), the apparatus comprising:
    a controller for allocating a plurality of Resource Element (RE) groups to available resources in the downlink control channel in a time first manner, wherein the available resources are divided into a two-dimensional frequency/time structure, and wherein, during allocation, a time index is increased from an initial value up to a predetermined value in a given frequency index, before increasing to a next frequency index and resetting the time index to the initial value;
    a mapper for mapping the downlink control channel to REs; and a transmitter for transmitting downlink control information via the mapped downlink control channel;

wherein each of the plurality of RE groups comprises four REs, and each RE group has a single time index.

9. The apparatus of claim 8, wherein at least one of the plurality of RE groups comprises an RE for transmission of a reference signal used for channel estimation.

10. The apparatus of claim 9, wherein the at least one of the plurality of RE groups that comprises the RE for transmission of the reference signal has a number of allocated REs that is greater than four.

11. The apparatus of claim 8, wherein the downlink control channel is a Packet Dedicated Control Channel (PDCCH) and the plurality of RE groups are not assigned a Physical Channel Format Indication Channel (PCFICH) or a Physical Hybrid Automatic Repeat reQuest (H-ARO) Indicator Channel (PHICH).

12. The apparatus of claim 8, wherein the transmitter transmits information associated with the available resources.

13. The apparatus of claim 8, wherein the predetermined value is a number of OFDM symbols used for transmission of the downlink control channel.

14. The apparatus of claim 8, wherein a time index of a first RE in a given RE group is the single time index for the given RE group.

15. A method for receiving a downlink control channel in a mobile communication system using Orthogonal Frequency Division Multiplexing (OFDM), the method comprising the steps of:

receiving the downlink control channel comprising a plurality of Resource Element (RE) groups; and demapping downlink control information from the received downlink control channel;

wherein each of the plurality of RE groups comprises four REs, and each RE group has a single time index; and wherein the plurality of RE groups are allocated to available resources in the downlink control channel in a time first manner, wherein the available resources are divided into a two-dimensional frequency/time structure, and wherein, during allocation, a time index is increased from an initial value up to a predetermined value in a given frequency index, before increasing to a next frequency index and resetting the time index to the initial value.

16. The method of claim 15, further comprising receiving information associated with the available resources.

17. The method of claim 15, wherein the predetermined value is a number of OFDM symbols used for transmission of the downlink control channel.

18. The method of claim 15, wherein the downlink control channel is a Packet Dedicated Control Channel (PDCCH) and the plurality of RE groups are not assigned a Physical Channel Format Indication Channel (PCFICH) or a Physical Hybrid Automatic Repeat reQuest (H-ARQ) Indicator Channel (PHICH).

19. The method of claim 15, wherein a time index of a first RE in a given RE group is the single time index for the given RE group.

20. The method of claim 15, wherein at least one of the plurality of RE groups comprises an RE for transmission of a reference signal used for channel estimation.

21. The method of claim 20, wherein the at least one of the plurality of RE groups that comprises the RE for transmission of the reference signal has a number of allocated REs that is greater than four.

22. An apparatus for receiving a downlink control channel in a mobile communication system using Orthogonal Frequency Division Multiplexing (OFDM), the apparatus comprising:

a receiver for receiving the downlink control channel;

a demapper for demapping downlink control information from the received downlink control channel; and a controller for identifying that the control channel comprises a plurality of Resource Element (RE) groups that are allocated to available resources in the downlink control channel in a time first manner, wherein the available resources are divided into a two-dimensional frequency/time structure, and wherein, during allocation, a time index is increased from an initial value up to a predetermined value in a given frequency index, before increasing to a next frequency index and resetting the time index to the initial value;

wherein each of the plurality of RE groups comprises four REs, and each RE group has a single time index.

23. The apparatus of claim 22, wherein the receiver receives information associated with the available resources.

24. The apparatus of claim 22, wherein the predetermined value is a number of OFDM symbols used for transmission of the downlink control channel.

25. The apparatus of claim 22, wherein the downlink control channel is a Packet Dedicated Control Channel (PDCCH) and the plurality of RE groups are not assigned a Physical Channel Format Indication Channel (PCFICH) or a Physical Hybrid Automatic Repeat reQuest (H-ARQ) Indicator Channel (PHICH).

26. The apparatus of claim 22, wherein a time index of a first RE in a given RE group is the single time index for the given RE group.

27. The apparatus of claim 22, wherein at least one of the plurality of RE groups comprises an RE for transmission of a reference signal used for channel estimation.

28. The apparatus of claim 27, wherein the at least one of the plurality of RE groups that comprises the RE for transmission of the reference signal has a number of allocated REs that is greater than four.

* * * * *